United States Patent
Lee et al.

(10) Patent No.: US 11,743,342 B2
(45) Date of Patent: Aug. 29, 2023

(54) ELECTRONIC DEVICE FOR PERFORMING EDGE COMPUTING SERVICE AND A METHOD FOR THE SAME

(71) Applicant: Samsung Electronics Co., Ltd., Suwon-si (KR)

(72) Inventors: Wonbo Lee, Suwon-si (KR); Sungin Kim, Suwon-si (KR); Youngwook Kim, Suwon-si (KR); Jinhyoung Kim, Suwon-si (KR); Taewan Kim, Suwon-si (KR); Hongshik Kim, Suwon-si (KR); Ansik Shin, Suwon-si (KR); Sangcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/568,384

(22) Filed: Jan. 4, 2022

(65) Prior Publication Data

US 2022/0255998 A1    Aug. 11, 2022

Related U.S. Application Data

(63) Continuation of application No. PCT/KR2021/019218, filed on Dec. 16, 2021.

(30) Foreign Application Priority Data

Feb. 5, 2021    (KR) .................. 10-2021-0016549

(51) Int. Cl.
*H04L 67/141*    (2022.01)
*H04L 67/1021*    (2022.01)
*H04L 69/322*    (2022.01)

(52) U.S. Cl.
CPC ........ *H04L 67/141* (2013.01); *H04L 67/1021* (2013.01); *H04L 69/322* (2013.01)

(58) Field of Classification Search
CPC .. H04L 67/141; H04L 67/1021; H04L 69/322
See application file for complete search history.

(56) References Cited

U.S. PATENT DOCUMENTS

| 10,567,495 B2 | 2/2020 | Gandhi et al. |
| 10,805,425 B2 | 10/2020 | Kotecha et al. |

(Continued)

FOREIGN PATENT DOCUMENTS

| CN | 112130931 A | 12/2020 |
| KR | 10-2019-0132018 A | 11/2019 |

(Continued)

OTHER PUBLICATIONS

'3GPP; TSG SA; Study on enhancement of support for Edge Computing in 5G Core network (5GC) (Release 17)', 3GPP TR 23.748 V17.0.0, Section 4.2, 6.1, 6.1.1, 6.1.2.1, 6.2.3.1, 6.2.3.2, 6.4.2, 6.5.1, 6.5.2.1; Fig. 6.1.2.1-1, Dec. 17, 2020.

(Continued)

*Primary Examiner* — Alina A Boutah
(74) *Attorney, Agent, or Firm* — Jefferson IP Law, LLP

(57) ABSTRACT

An electronic device and an operation method of an electronic device are provided. The electronic device includes a memory storing an application, an edge enabler client (EEC), and/or a user equipment (UE) route selection policy (URSP) rule used for producing a session used by the electronic device, a communication circuit used for a communication connection between the electronic device and at least one of a first server, a plurality of second servers, or a third server disposed outside the electronic device, via a base station, and a processor, the application being configured to perform, in the electronic device, one or more services corresponding to an application executable in the third server, and the processor is configured to identify identification information of the EEC and identification information of an EEC included in the URSP rule, in response to (Continued)

activation of the EEC, to set a first packet data unit (PDU) session.

21 Claims, 11 Drawing Sheets

(56) References Cited

U.S. PATENT DOCUMENTS

| | | | |
|---|---|---|---|
| 11,019,491 B2 | 5/2021 | Lee et al. | |
| 11,134,127 B2 | 9/2021 | Lee et al. | |
| 11,277,305 B2 | 3/2022 | Hall et al. | |
| 11,381,407 B2 | 7/2022 | Mukherjee et al. | |
| 2019/0356743 A1 | 11/2019 | Park et al. | |
| 2021/0075892 A1* | 3/2021 | Chun | H04L 69/163 |
| 2021/0352090 A1 | 11/2021 | Kim et al. | |
| 2022/0174033 A1* | 6/2022 | Ke | H04L 61/5084 |
| 2022/0191090 A1* | 6/2022 | Lee | H04L 67/535 |
| 2022/0191100 A1* | 6/2022 | Kim | H04M 15/66 |
| 2022/0338000 A1* | 10/2022 | Lee | H04W 12/06 |
| 2022/0360645 A1* | 11/2022 | Badic | H04L 67/51 |
| 2023/0037031 A1* | 2/2023 | Wang | H04W 8/08 |

FOREIGN PATENT DOCUMENTS

| | | | | |
|---|---|---|---|---|
| KR | 10-2020-0007754 A | | 1/2020 | |
| KR | 10-2020-0033092 A | | 3/2020 | |
| KR | 20200115333 A | * | 10/2020 | H04L 67/146 |
| KR | 10-2020-0130106 A | | 11/2020 | |
| KR | 20210040776 A | * | 4/2021 | H04W 88/18 |
| KR | 10-2021-0136794 A | | 11/2021 | |
| KR | 20210136486 A | * | 11/2021 | H04L 67/52 |
| KR | 20210136794 A | * | 11/2021 | H04L 67/141 |
| KR | 20210145558 A | * | 12/2021 | H04L 67/564 |
| KR | 20220057719 A | * | 5/2022 | H04W 64/00 |
| WO | 2018/093638 A1 | | 5/2018 | |
| WO | 2020/013677 A1 | | 1/2020 | |
| WO | WO-2020197288 A1 | * | 10/2020 | H04L 41/0853 |
| WO | WO-2021036927 A1 | * | 3/2021 | H04L 61/1511 |
| WO | WO-2021066452 A1 | * | 4/2021 | H04W 12/06 |
| WO | WO-2021078936 A1 | * | 4/2021 | H04L 61/1511 |
| WO | WO-2021138069 A1 | * | 7/2021 | H04W 4/40 |
| WO | WO-2022012743 A1 | * | 1/2022 | |
| WO | WO-2022036102 A1 | * | 2/2022 | H04L 67/148 |
| WO | WO-2022148533 A1 | * | 7/2022 | |

OTHER PUBLICATIONS

'3GPP; TSG SA; Study on application architecture for enabling Edge Applications; (Release 17)', 3GPP TR 23.758 V17.0.0, Section 7.23.1.1; Fig. 7.23.1.2-1, Dec. 19, 2019.
'3GPP; TSG SA; Architecture for enabling Edge Applications; (Release 17)', 3GPP TS 23.558 V1.3.0, Section 8.8.2.2, Feb. 4, 2021.
NTT Docomo, 'Solution to new Key Issue on provisioning EDN configuration to the UE', S2-1909762, SA WG2 Meeting #135, Section 2, 6.X.2, 6.X.3, Oct. 4, 2019.
International Search Report and Written Opinion dated Mar. 24, 2022, issued in International Patent Application No. PCT/KR2021/019218.
3GPP TS 23.503 V16.6.0 (Sep. 2020) 3rd Generation Partnership Project, Technical Specification Group Services and System Aspects, Policy and charging control framework for the 5G System (5GS), Stage 2, (Release 16), Sep. 24, 2020.

* cited by examiner

ELECTRONIC DEVICE FOR PERFORMING EDGE COMPUTING SERVICE AND A METHOD FOR THE SAME

CROSS-REFERENCE TO RELATED APPLICATION(S)

This application is a continuation application, claiming priority under § 365(c), of an International application No. PCT/KR2021/019218, filed on Dec. 16, 2021, which is based on and claims the benefit of a Korean patent application number 10-2021-0016549, filed on Feb. 5, 2021, in the Korean Intellectual Property Office, the disclosure of which is incorporated by reference herein in its entirety.

TECHNICAL FIELD

The disclosure relates to an electronic device and an operation method of an electronic device. More particularly, the disclosure relates to an electronic device that performs an edge computing service.

BACKGROUND ART

Various electronic devices, such as a smartphone, a tablet personal computer (PC), a portable multimedia player (PMP), a personal digital assistant (PDA), a laptop personal computer (laptop PC), and a wearable device, and the like, have become popularized, and accordingly, various wireless communication technologies used when various electronic devices perform communication are being developed.

In order to meet wireless data traffic demands that have increased after commercialization of the $4^{th}$ generation (4G) communication system, efforts to develop a $5^{th}$ generation (5G) communication system are being made. For this reason, the 5G communication system is called a beyond 4G network communication system or a post-long-term evolution (LTE) system. In order to achieve a high data transmission rate, implementation of the 5G communication system in a higher frequency band (e.g., 60 giga (GHz) band), in addition to a band less than or equal to $6^{th}$ generation (6G), is being considered. In the 5G communication system, technologies such as beamforming, massive Multiple-Input Multiple-Output (MIMO), full dimensional MIMO (FD-MIMO), array antenna, analog beam-forming, and large-scale antenna technologies are being discussed.

In the 5G communication system, various technologies are suggested and implemented in order to decrease a transmission time or to reduce a latency time. Among the technologies, an edge computing service is technology that implements an edge network system in an area close to a base station so that an electronic device connected to the base station is capable of receiving various services using the edge network system implemented in the area close to the base station. The edge computing service may decrease the distance between the electronic device of the user and the network.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to provide an electronic device capable of performing an edge computing service may receive, from an edge network system, the access information of the edge network system and configuration information for setting up a packet data unit (PDU) session for exchanging data between the edge network system and the electronic device, in order to access the edge network system. The electronic device may obtain the access information of the edge network system and the configuration information for setting up the PDU session via a provisioning procedure and/or discovery procedure with the edge network system.

The edge network system may obtain the configuration information for setting up the PDU session from a core network operated by a communication network operator. The edge network system may not obtain the configuration information for setting up the PDU session due to various causes (e.g., transmission of information associated with a PDN or PDU session to a third party that operates the edge network system is difficult due to security).

In this instance, the electronic device may not use a separate PDU session that supports a relatively high data transmission/reception speed, and may be connected to the edge network system via a PDU session which is basically usable, and thus, may perform an edge computing service with a relatively low speed.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory storing an application, an edge enabler client (EEC), and/or a user equipment (UE) route selection policy (URSP) rule used for producing a session to be used by the electronic device, a communication circuit to be used for a communication connection between the electronic device and a first server, a plurality of second servers, and/or a third server disposed outside the electronic device, via a base station, and a processor, wherein the application is configured to perform, in the electronic device, one or more services corresponding to an application executable in the third server, wherein the processor is configured to identify identification information of the EEC and identification information of an EEC included in the URSP rule, in response to activation of the EEC, to set a first PDU session based on configuration information of the first PDU session included in the URSP rule, in response to accordance between the identification information of the EEC and the identification information included in the URSP rule, to perform a provisioning procedure with the first server via the first PDU session, to select a second server to access based on access information of the second server which is for accessing the second server and is received via the provisioning procedure, to perform a discovery procedure with the selected second server via the first PDU session, and to perform, via the first PDU session, the service with a third server selected based on access information of the third server which is received via the discovery procedure.

In accordance with another aspect of the disclosure, an operation method of an electronic device is provided. The operation method includes identifying identification information of an edge enabler client (EEC), and identification information of an EEC included in a UE route selection policy (URSP) rule used for producing a session to be used by the electronic device, in response to activation of the EEC, setting up a first PDU session based on configuration information of the first PDU session included in the URSP, in response to accordance between the identification information of the EEC and the identification information included in the URSP rule, performing a provisioning procedure with a first server via the first PDU session, selecting a second server to access based on access information of the second server which is for accessing the second server and is received via the provisioning procedure, performing a discovery procedure with the selected second server via the first PDU session, and performing, via the first PDU session, the service with a third server selected based on access information of the third server received via the discovery procedure.

Advantageous Effects

According to various embodiments, an electronic device and an operation method of the electronic device can manage a URSP rule received from a core network and the access information of a second server received from an edge network system via interoperation. The electronic device and the operation method of the electronic device can obtain, via the URSP rule, the configuration information of a first PDU session which is a dedicated session between the electronic device and the edge network system, and can perform a service provided by the edge network system based on the URSP rule and the access information of the second server. Therefore, the electronic device is connected to the edge network system via a PDU session capable of implementing a relatively high transmission/reception speed, and can receive an edge computing service with a relatively high speed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
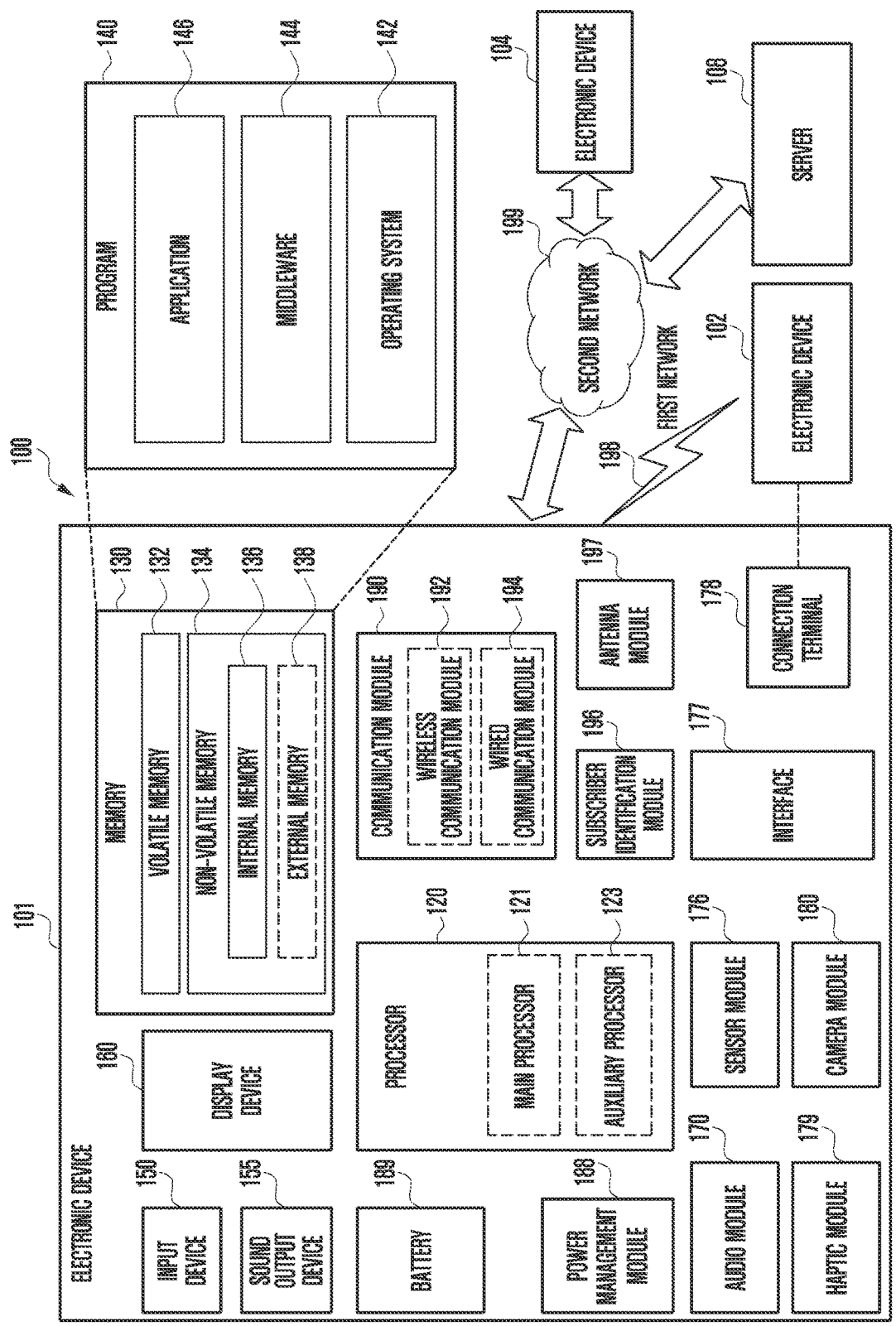
FIG. 1 is a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
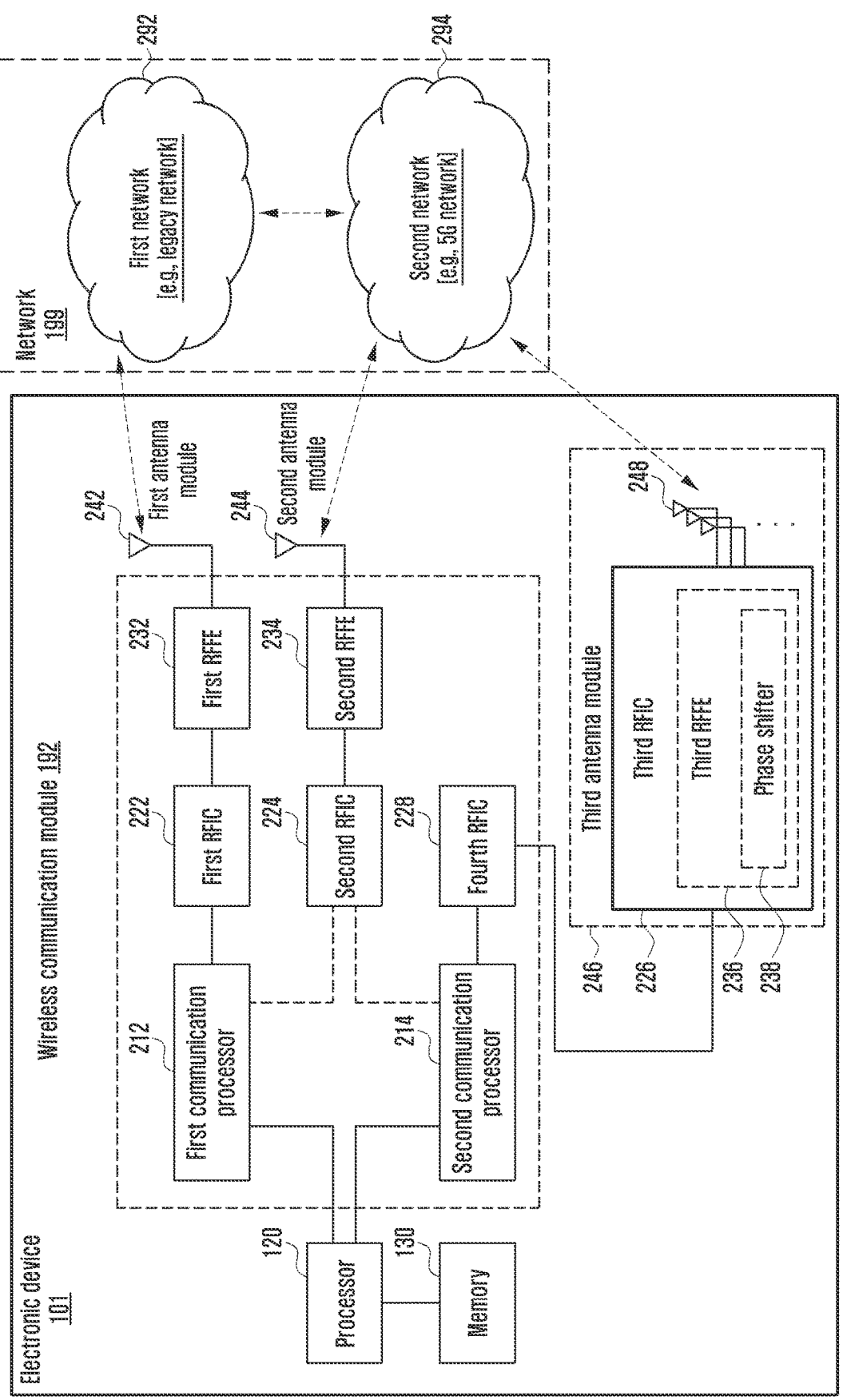
FIG. 2 is a block diagram of an electronic device according to an embodiment of the disclosure.

FIG. 2 is a block diagram illustrating an electronic device in a network environment including a plurality of cellular networks according to an embodiment of the disclosure.

Referring to FIG. 2, an electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
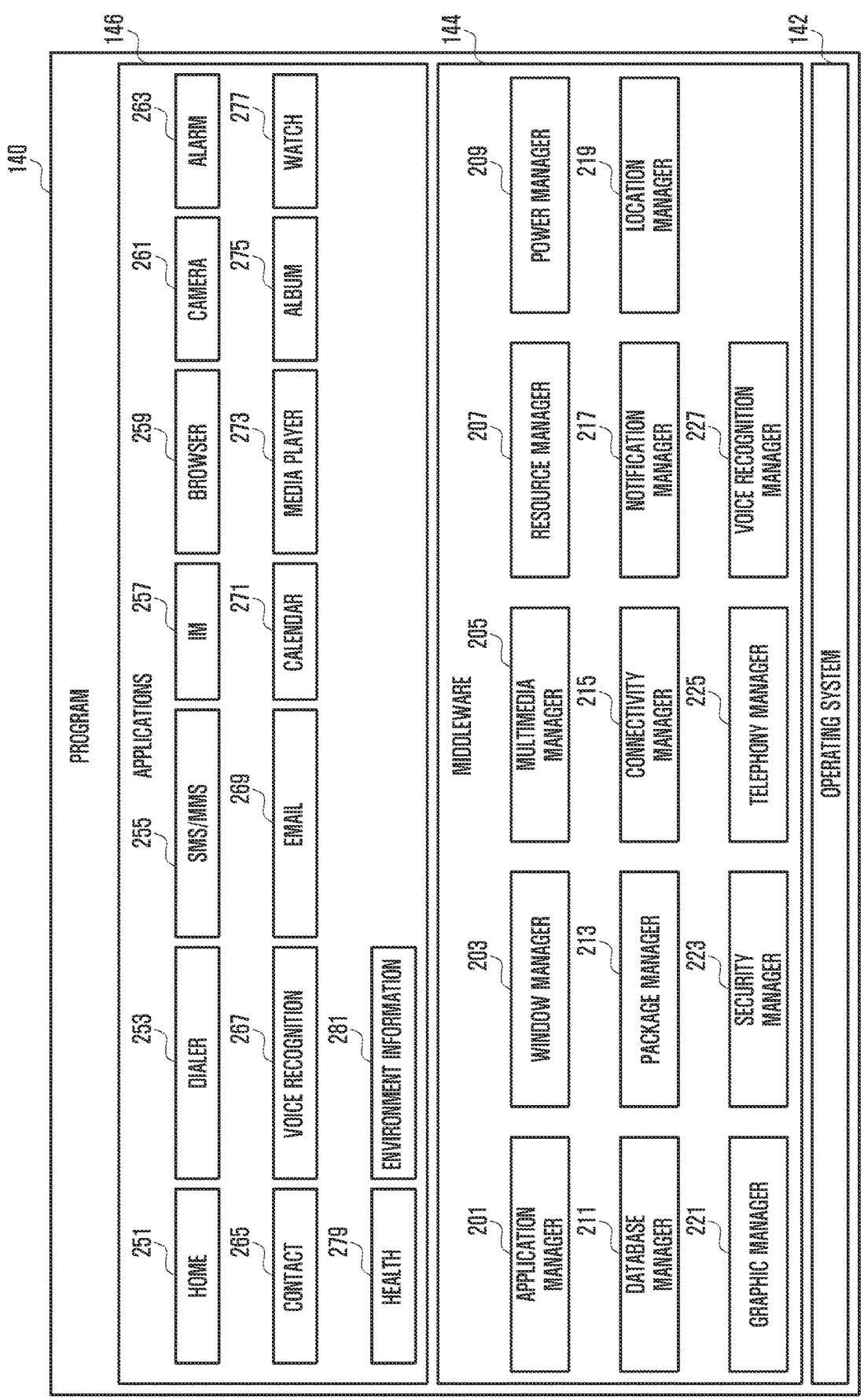
FIG. 3 is a block diagram illustrating a program according to an embodiment of the disclosure.

FIG. 3 is a block diagram 300 illustrating a program according to an embodiment of the disclosure.

Referring to FIG. 3, according to an embodiment, a program 140 may include an operating system (OS) 142 to control one or more resources of the electronic device 101, middleware 144, or an application 146 executable in an OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 4:
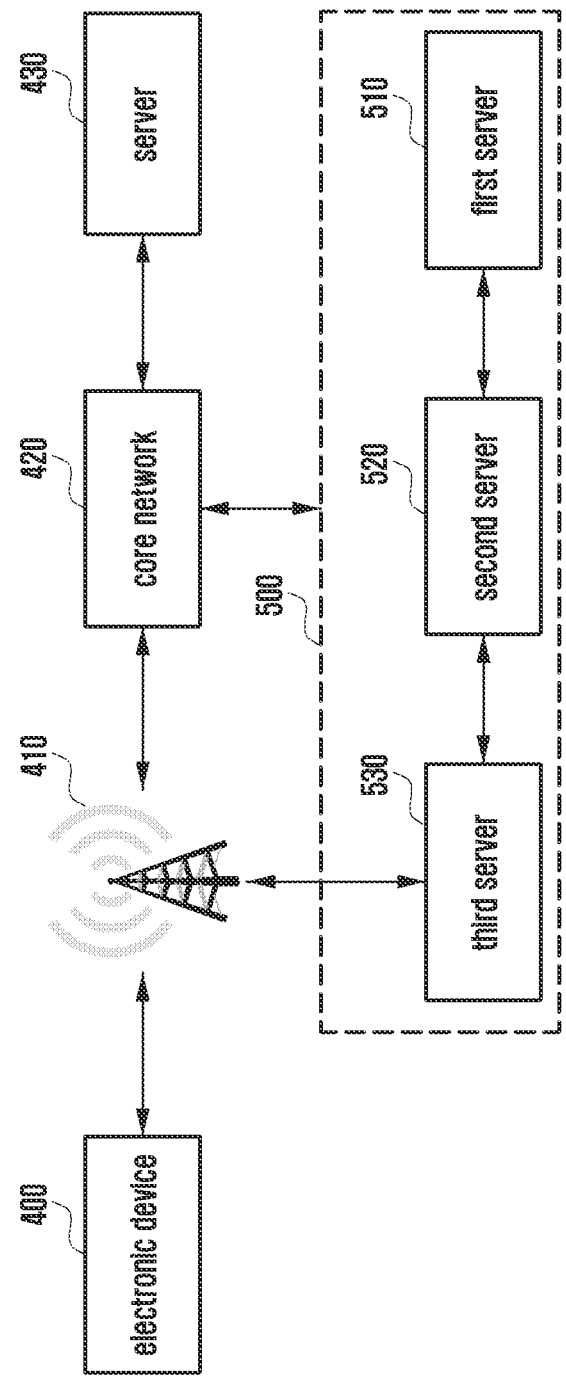
FIG. 4 is a block diagram illustrating a network system according to an embodiment of the disclosure.

FIG. 4 is a block diagram illustrating a network system according to an embodiment of the disclosure.

FIG. 4 illustrates a network system in which an electronic device uses an edge network system.

Referring to FIG. 4, according to various embodiments of the disclosure, a network system may include an electronic device 400 (e.g., an electronic device 101 of FIG. 1), a base station 410, a core network 420, a server 430, and/or an edge network system 500.

The electronic device 400 according to various embodiments of the disclosure may receive data provided by the server 430 via the base station 410 and the core network 420, or may transmit data to the server 430. The server 430 may be a server located (e.g., the Internet network) outside a network operated by a cellular communication operator (e.g., a network including the base station 410 and the core network 420). According to an embodiment, a subject that operates the server 430 may be an operator which is different from a cellular communication operator.

According to various embodiments of the disclosure, the electronic device 400 may perform transmission or reception of control data or user data with the base station 410, while performing cellular communication. The cellular communication may be any one of various cellular communication schemes that the electronic device 400 is capable of supporting. For example, the cellular communication may be one of cellular communication (e.g., long-term evolution (LTE), LTE-advanced (LTE-A), and LTE-advanced pro (LTE-A pro)) via a first network (e.g., the first network 198 of FIG. 1), or cellular communication (e.g., 5G on below 6 GHz or 5G on above 6 GHz) via a second network (e.g., the second network 199 of FIG. 1).

According to various embodiments, the base station 410 may be connected to the electronic device 400 in a wireless manner, and may be connected to the core network 420 and/or the edge network system 500 in a wired or wireless manner, such that a path for data transmission or reception is established between the electronic device 400 and the core network 420 and/or the edge network system 500. The base station 410 may transmit control data or user data transmitted from the core network 420 and/or the edge network system 500, to the electronic device 400. The base station 410 may transmit control data or user data transmitted from the electronic device 400 to the core network 420 and/or the edge network system 500. The control data may be data for controlling various operations via cellular communication of the electronic device 400. The user data may be IP data transmitted via cellular communication of the electronic device 400. For example, the base station 410 may be defined as an eNodeB (eNB) in the $4^{th}$ generation mobile communication scheme and may be defined as a gNodeB (gNB) in the $5^{th}$ mobile communication scheme.

According to various embodiments, the core network 420 may perform various functions (e.g., call connection, IP data processing, authentication of the electronic device 400, charging payment for a cellular communication service that the electronic device 400 uses, mobility management associated with the electronic device 400, or connecting the electronic device 400 to an external network) using cellular communication that the electronic device 400 uses. The core network 420 may be defined as an evolved packet core (EPC) in the $4^{th}$ generation mobile communication scheme, and may be defined as the $5^{th}$ generation core (5GC) in the $5^{th}$ mobile communication scheme.

According to various embodiments, the core network 420 that supports the 5G mobile communication may be capable of supporting more various functions (e.g., edge computing) compared to a core network that supports the 4G mobile communication. Edge computing may be technology of performing various services via the edge network system 500 implemented in a location physically close to the electronic device 400 (e.g., a location physically close to the base station 410 or inside the base station 410), in order to implement a fast communication speed or a low latency time. When compared to the server 430, the edge network system 500 may be implemented in a location physically closer to the electronic device 400, so that data communication via the edge network system 500 may be implemented with a higher communication speed and/or lower latency time than data communication via the core network 420. For example, the edge network system 500 may be directly connected to the core network 420, or may be located in a location physically close to the core network 420 or inside the core network 420.

According to various embodiments of the disclosure, a first server 510 may be a server that provides information associated with at least one second server 520 to which the electronic device 400 is connectable. For example, the information associated with the second server 520 may include the access address information of the second server 520 including the access information of the second server 520 (e.g., the IP address of the second server 520, the domain name of the second server 520, and/or the uniform resource identifier (URI) of the second server 520) and the identifier of the second server 520. The first server 510 may be an element that is identical or similar to an edge data network configuration server (ECS) defined in TS 23.558.

According to various embodiments of the disclosure, the second server 520 may be a server that is connected to a third server 530, and manages various operations of the third server 530. The second server 520 may receive performance information of the third server 530 (e.g., available resources (e.g., memory capacity or bandwidth) of the third server 530) from the third server 530. The second server 520 may transmit information associated with at least one third server 530 connected to the second server 520, in response to a request from the electronic device 400. The second server 520 may be an element that is identical or similar to an edge enabler server (EES) defined in TS 23.558.

Figure 5:
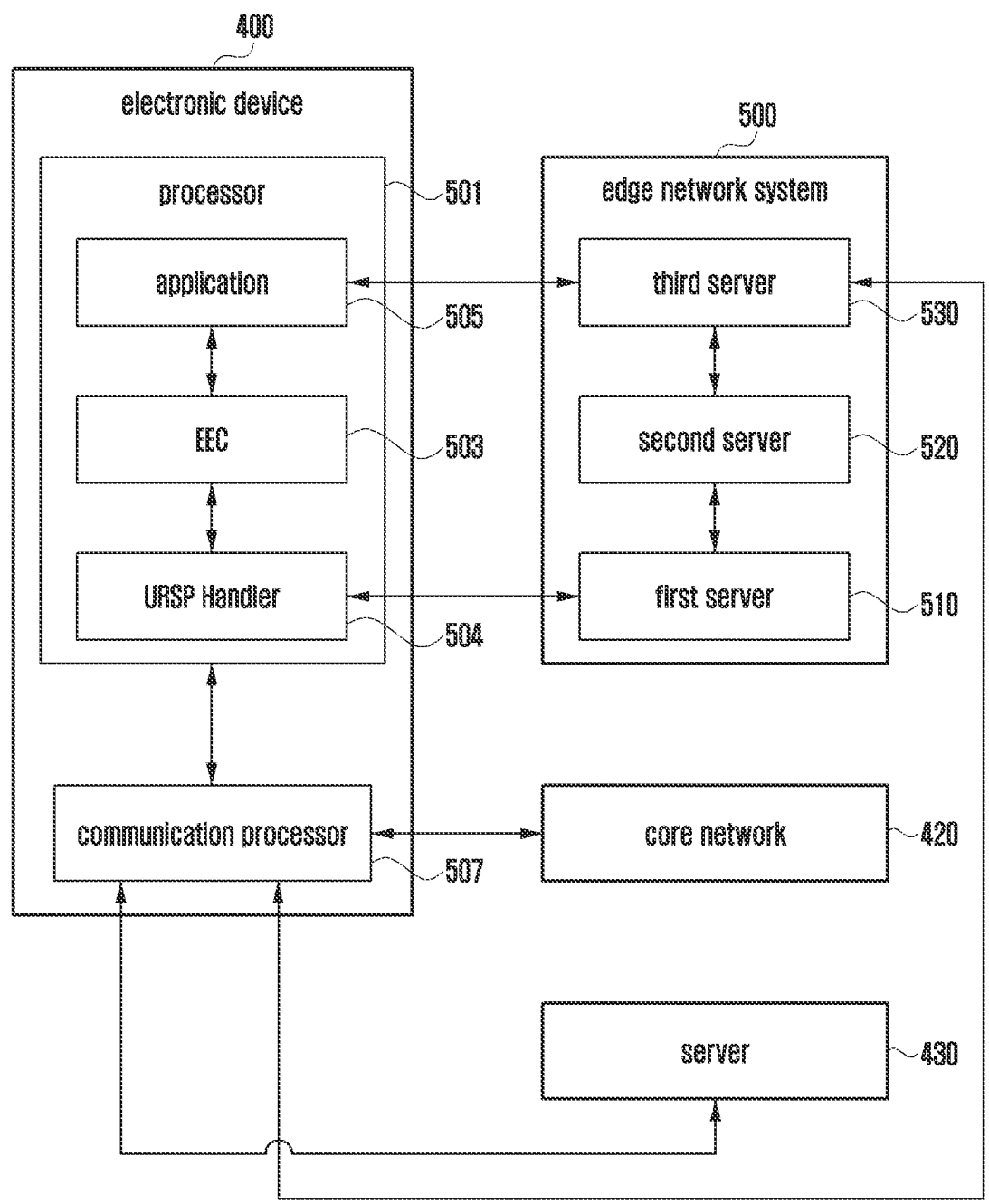
FIG. 5 is a diagram illustrating an electronic device, an edge network, and/or a core network according to an embodiment of the disclosure.

According to various embodiments of the disclosure, the third server 530 may be a server that provides an edge computing service usable by the application 505 installed in the electronic device 400. The third server 530 may provide application data related to an edge computing service to the application 505. The third server 530 may be an element that is identical or similar to an edge application server (EAS) defined in TS 23.558. Although FIG. 5 illustrates the single third server 530, multiple third servers 530 may be disposed depending on a service provided. At least one third server 530 may be disposed (deployed) in various locations inside the mobile communication network, and may provide an edge service to a user equipment (UE) disposed in a location adjacent thereto.

According to various embodiments of the disclosure, the electronic device 400 may transmit, to the core network 420, a signal that requests access to the first server 510 in order to connect to the edge network system 500. The core network 420 may transmit the access information of the first server 510 to the electronic device 400 via various procedures (e.g., authentication of the electronic device 400).

According to various embodiments of the disclosure, for ease of description, although it is illustrated that all of the first server 510, the second server 520, and the third server 530 included in the edge network system 500 are disposed close to the base station 410 (or close to the electronic device 400), this is not limited thereto and various deployments may be possible. For example, the first server 510 and the second server 520 may be connected to a core network (e.g., the core network 420 of FIG. 4) or may be disposed close to the core network, and the third server 530 may be disposed in a location close to the electronic device 400 (e.g., connected to or close to the base station 410). As another example, the first server 510 and the second server 520 may be disposed (e.g., Internet network) outside a mobile communication network (e.g., a network including the base station 410 and the core network 420) operated by a cellular communication operator, and the third server 530 may be disposed in a location close to the electronic device 400. Alternatively, the first server 510 and the second server 520 may be implemented as a single integrated entity. If the edge network system 500 according to various embodiments includes at least one third server 530 that is disposed more closer to the electronic device 400 than the external server 430 and is capable of providing an edge service, a skilled in the art field would easily understand that elements included in the edge network system 500 are capable of being disposed in various deployments.

According to various embodiments of the disclosure, the electronic device 400 may connect to a first server (e.g., the first server 510 of FIG. 4), and may perform a provisioning procedure for an edge service. The provisioning procedure may include an operation of transmitting, to the first server 510, a signal for requesting the access information of the second server 520. The first server 510 may transmit, to the electronic device 400, the access information of the second server 520 (e.g., the identifier of the second server 520, the URI information of the second server 520, the domain information of the second server 520, the IP address information of the second server 520, at least one of access point name (APN) information and/or data network name (DNN) information corresponding to a dedicated public data network (PDN) or packet data unit (PDU) if a dedicated PDN or PDU session of the edge network system 500 is present, and/or information (e.g., token) used for verification for a valid connection of the second server 520).

According to various embodiments of the disclosure, the electronic device 400 may select a second server to access among at least one second server 520 included in the access information of the second server 520 received via the provisioning procedure. The electronic device 400 may connect to the selected second server 520, and may perform a discovery procedure for an edge service. The discovery procedure may include an operation of transmitting, to the second server 520, a signal for requesting the access information of the third server 530. The second server 520 may transmit, to the electronic device 400, the access information of the third server 530 (e.g., the identifier of the third server 530, the URI information of the third server 530, the domain information of the third server 530, the IP address information of the third server 530, at least one of access point name (APN) information and/or data network name (DNN) information corresponding to a dedicated public data network (PDN) or packet data unit (PDU) if a dedicated PDN or PDU session of the edge network system 500 is present, and/or information (e.g., token) used for verification for a valid connection of the third server 530).

According to various embodiments of the disclosure, the electronic device 400 may access the edge network system 500 based on the information associated with the PDN or PDU session of the edge network system 500 included in the access information of the second server 520 and/or the access information of the third server 530.

According to various embodiments of the disclosure, if the information associated with the PDN or PDU session of the edge network system 500 is received from the core network 420 operated by a network operator, the edge network system 500 may add the received information to the access information of the second server 520 and/or the access information of the third server 530. The core network 420 may not transmit the information associated with the PDN or PDU session of the edge network system 500 to the edge network system 500 due to various causes (e.g., transmission of the information associated with the PDN or PDU session to a third party that operates the edge network system 500 is difficult due to security).

According to various embodiments of the disclosure, the electronic device 400 may receive a UE route selection policy (URSP) rule including information for setting up a packet data unit (PDU) session for accessing the edge network system 500, from the core network 420 (or an access and mobility management function (AMF) and/or a policy control function (PCF) implemented in the core network 420). The core network 420 may transmit the URSP to the electronic device 400 via a non-access stratum (NAS) protocol implemented for exchanging control data between the electronic device 400 and the core network 420.

According to various embodiments of the disclosure, the URSP rule may include information related to a PDU session operation policy. The URSP rule may include information related to an element which is capable of using a predetermined PDU session (e.g., the identification information of the application 505 of FIG. 5 or the identification information of the EEC 503) and/or information related to an element which is accessible via the predetermined PDU session (e.g., the identification information of the first server 510, the second server 520, and/or the third server 530 of FIG. 4, the access address information of the first server 510, the second server 520, and/or the third server 530 (e.g., the IP address, port number, or protocol information of the first server 510, the second server 520, and/or the third server 530), and the domain name of the first server 510, the second server 520, and/or the third server 530). The information related to an element capable of using the predetermined PDU session may be included in the traffic descriptor field of the URSP rule. For example, the traffic descriptor field may include the identification information (e.g., OSId, OSAppId) of an application that accesses the predetermined server (e.g., the first server 510, the second server 520, and/or the third server 530), the access address information of the predetermined server (e.g., an IP address, a port number, protocol information, a domain name), and/or the name (data network name (DNN)) of a network accessed via the predetermined PDU session.

According to various embodiments of the disclosure, the URSP rule may include information related to the characteristic of the predetermined PDU session. The characteristic of the predetermined PDU session may include various types of information including the list of the names (data network name (DNN)) of networks accessible via the predetermined PDU session, single network slice selection assistance information (S-NSSAI) indicating the identification information of a network slice used by the predetermined PDU session, and/or information (service session continuity (SSC mode)) indicating a mode related to continuity of the connection of the predetermined PDU session. The information including the characteristic of the predetermined PDU session may be included in the route selection descriptor field of the URSP rule. The information including the predetermined PDU session may be information needed for the electronic device 400 to set up the predetermined PDU session (e.g., produce, identify, and/or select the predetermined PDU session).

According to various embodiments of the disclosure, the electronic device 400 may receive the URSP rule from the core network 420, and may set up a PDU session to be used for accessing the edge network system 500 based on the URSP rule. Considering the characteristic of the edge network system 500 that dynamically changes (e.g., the third server 530 to be accessed may be changed based on the movement of the electronic device 400) when compared to the core network 420, the core network 420 that has a relatively static characteristic may be difficult to apply the changed information of the edge network system 500 to the URSP rule.

Hereinafter, an embodiment in which the electronic device 400 performs an edge service based on the access information of the second server 520, the access information of the third server 530, and/or the URSP rule.

FIG. 5 is a diagram illustrating an electronic device, an edge network, and/or a core network according to an embodiment of the disclosure.

Referring to FIG. 5, according to various embodiments of the disclosure, an edge network system 500 may include a first server 510, a second server 520, and/or a third server 530.

According to various embodiments of the disclosure, the third server 530 may be a server that provides an edge computing service usable by the application 505 installed in the electronic device 400. The third server 530 may provide application data related to the edge computing service to the application 505. The third server 530 may be an element that is identical or similar to an edge application server (EAS) defined in TS 23.558.

According to various embodiments of the disclosure, the second server 520 may be a server that is connected to the third server 530, and manages various operations of the third server 530. The second server 520 may receive capacity information of the third server 530 (e.g., available resources (e.g., memory capacity or bandwidth) of the third server 530) from the third server 530. The second server 520 may transmit information associated with at least one third server 530 connected to the second server 520, in response to a request from the electronic device 400. The second server 520 may be an element that is identical or similar to an edge enabler server (EES) defined in TS 23.558.

According to various embodiments of the disclosure, the first server 510 may be a server that provides information associated with at least one second server 520 to which the electronic device 400 is connectable. For example, the information associated with the second server 520 may include the access information of the second server 520 (e.g., the access address information of the second server 520 including the IP address of the second server 520, the domain name of the second server 520, and/or the uniform resource identifier (URI) of the second server 520, and the identifier of the second server 520). The first server 510 may be an element that is identical or similar to an edge data network configuration server (ECS) defined in TS 23.558.

According to various embodiments of the disclosure, the electronic device 400 may include a processor (e.g., the processor 120 of FIG. 1) 501, a memory (e.g., the memory 130 of FIG. 1, not illustrated), and/or a communication processor 507 (e.g., the auxiliary processor 123 of FIG. 1, the wireless communication module 192 of FIG. 1, the first communication processor 212 of FIG. 2, and/or the second communication processor 214 of FIG. 2).

The memory 130 may store various program modules executable on the processor 501. The memory 130 may store an application 505 (e.g., the application 146 of FIG. 1) capable of executing a service using the edge network system 500 and various elements (e.g., an edge enabler client (EEC) 503) for supporting edge computing. The processor 501 may load and execute (or operate) various program modules (e.g., the EEC 503 and the application 505) stored in the memory 130. The EEC 503 may be implemented in an application layer (e.g., the application 146 of FIG. 1), middleware (e.g., the middleware 144 of FIG. 1), and/or an operating system (e.g., the operating system 142 of FIG. 1).

According to various embodiments of the disclosure, the EEC 503 may perform various operations for identifying the application 505 capable of using an edge computing service among various applications which are being executed (or operated) in the electronic device 400, and for performing configuration so that the application 505 is capable of transmitting or receiving data of the application 505 to the third server 530.

The EEC 503 may receive, from the edge network system 500, the access information of elements of the edge network system 500 which enable the application 505 to exchange application data via the edge network system 500, and may control the connection between the edge network system 500 and the electronic device 400 based on the access information.

According to various embodiments, the communication processor 507 may set up a PDU session for data transmission or reception between various elements (e.g., the application 505 and the EEC 503) of the electronic device 400 and an external electronic device (e.g., the edge network system 500, the core network 420, and/or the server 430), and may transmit data transmitted by various elements of the electronic device 400 to an external electronic device via the set PDU session. The communication processor 507 may receive, from the core network 420, a UE route selection policy (URSP rule) including information for setting up a packet data unit (PDU) session for accessing the edge network system 500.

According to various embodiments of the disclosure, the URSP rule may include information related to a PDU session operation policy. The URSP rule may include information related to an element capable of using a predetermined PDU session (e.g., the identification information of the application 505 of FIG. 5, and the identification information of the EEC 503), information related to an element accessible by the electronic device 400 via a predetermined PDU session (e.g., the identification information of the first server 510, the second server 520, and/or the third server 530 of FIG. 4, the access address information of the first server 510, the second server 520, and/or the third server 530), and/or information including the characteristic of a predetermined PDU session (e.g., the list of names (data network name (DNN)) of networks accessible via a predetermined PDU session), a single network slice selection assistance information (S-NSSAI) indicating the identification information of a network slice used by a predetermined PDU session, and/or information (service session continuity (SSC mode)) indicating a mode related to continuity of a connection of a predetermined PDU session.

According to various embodiments of the disclosure, the communication processor 507 may transmit a URSP rule received from the core network 420 to the processor 501 (or EEC 503). The processor 501 (or EEC 503) may perform access to the edge network system 500 using the URSP, the access information of the second server 520, the access information of the third server 530, and/or the URSP rule. An embodiment of accessing the edge network system 500 using the access information of the second server 520, the access information of the third server 530, and/or the URSP rule will be described later.

According to various embodiments of the disclosure, the EEC 503 may perform an operation of connecting to the first server 510 based on the access information of the first server 510 which is received from a core network (e.g., the core network 420 of FIG. 4). According to another embodiment, the EEC 503 may perform an operation of connecting to the first server 510 based on the access information of the first server 510 which is stored in the electronic device (e.g., the memory 130 and/or a SIM card (e.g., the subscriber identification module 196 of FIG. 1)). The EEC 503 may transmit the identification information of the electronic device 400 (e.g., the international mobile subscriber identity (IMSI) of the electronic device 400) and/or a generic public subscription identifier (GPSI) to the first server 510, and the first server 510 may authenticate the electronic device 400 based on the identification information of the electronic device 400.

According to various embodiments of the disclosure, the EEC 503 may perform a provisioning procedure for an edge service after connection to the first server 510 is completed. The provisioning procedure may include an operation of transmitting, to the first server 510, a signal for requesting the access information of the second server 520. The first server 510 may transmit, to the electronic device 400, the access information of the second server 520 (e.g., the identifier of the second server 520, the URI information of the second server 520, the domain information of the second server 520, the IP address information of the second server 520, at least one of access point name (APN) information and/or data network name (DNN) information corresponding to a dedicated public data network (PDN) or packet data unit (PDU) if a dedicated PDN or PDU session of the edge network system 500 is present, and/or information (e.g., token) used for verification for a valid connection of the second server 520).

According to various embodiments of the disclosure, the access information of the second server 520 may be identical or similar to an EES list defined in TS 23.558. For example, the access information of the second server 520 may be implemented as shown in Table 1, and may be transmitted to the EEC 503. The access information of the second server 520 may include the identifier of the second server 520 and/or the access address information of the second server 520 (e.g., the URI information of the second server 520, the domain information of the second server 520, the IP address information of the second server 520, and access point name (APN) information and/or data network name (DNN) information corresponding to a dedicated public data network (PDN) or packet data unit (PDU) if a dedicated PDN or PDU session of the edge network system 500 is present).

TABLE 1

| Identifier of second server | Access address information |
|---|---|
| EES 1 | ees1.edge1.com |
| EES 2 | ees2.edge2.com |

According to various embodiments of the disclosure, the EEC 503 may attempt to access the selected second server 520 based on the access information (e.g., EES identifier, access address information) of the selected second server 520 which is received from the first server 510. The second server 520 may identify whether the electronic device 400 is an electronic device having the authority to access the second server 520 based on the access information (e.g., token) of the second server transmitted by the EEC 503, and may determine whether to allow access (or connection) of the electronic device 400 based on an identification result. For example, the second server 520 may receive a token, and may determine whether to allow the electronic device 400 to access (or connect to) the second server 520, by performing authentication with an authentication server (not illustrated) based on the received token. In this instance, the token may be information transmitted from the authentication server (not illustrated) to the electronic device 400.

According to various embodiments of the disclosure, the EEC 503 may perform an edge service discovery procedure (e.g., an edge service discovery, for example, a procedure of discovering service information executable in an edge server(s)) for obtaining information associated with the third server 530 capable of providing an edge computing service to the application 505. The EEC 503 may transmit, to the second server 520, an edge service discovery request message that requests the access information of at least one third server 530 connected to the second server 520. The second server 520 may transmit, to the EEC 503, an edge service discovery response message including the access information of the third server 530 that is stored in the second server 520.

The access information of the third server 530 may include the identifier (EASID) of the third server 530, the identifier (ACID) of an application installed in the electronic device 400, and/or the access address information of the third server 530 (e.g., the IP address of the third server 530, the domain name of the third server 530).

According to various embodiments of the disclosure, the third server 530 may be a software entity implemented in units of services. For example, a plurality of third servers 530 may be entities implemented on a single physical server and may be servers that provide different services. In this instance, the access information of the third server 530 may include the access information of applications executable in the third server 530 and/or the identifiers of applications which are installed in the electronic device 400 and are capable of performing services using the third server 530. The identifier of a service providable by the third server 530 may be the identifier of an application installed in the third server 530.

According to various embodiments of the disclosure, the access information of the third server 530 may be identical or similar to an EAS list defined in TS 23.558. The information associated with the third server 530 may be implemented as shown in Table 2, and may be transmitted to the EEC 503.

TABLE 2

| Identifier of third server | Application identifier (ACID) of application installed in electronic device | Access address information |
|---|---|---|
| EAS1 | com.android.app1 | ees1.edge1.com |
| EAS2 | com.android.app2 | 2.2.2.2 |
| EAS3 | com.android.app3 | ees3.edge3.com/3.3.3.3 |

The access information of the third server 530 included in Table 2 may include the identifier of the third server 530 and/or the identifier (ACID) of an application executed in the electronic device 400. For example, each row in Table 2 (e.g., EAS1, EAS2, and EAS3) may refer to the identifiers and the access addresses of a first server application and a second server application which are executable in the third server 530.

According to various embodiments of the disclosure, the identifier of the third server 530 may be the identifier of an application executed in the third server 530, which is a value that differs for each service application executable in the third server 530. If a plurality of service applications executable in the third server 530 are present, the third server 530 may have a plurality of identifiers of the third server 530. If a single service application executable in the third server 530 is present, the third server 530 may have a single identifier of the third server 530, and the identifier of the third server 530 may be interchangeably used with the identifier of an application executed in the third server 530.

According to various embodiments of the disclosure, URSP handler 504 may receive a URSP rule from the communication processor 507. According to an embodiment, the communication processor 507 may receive a URSP rule from the core network 420 in response to the fact that the electronic device 400 satisfies a designated condition (e.g., a condition that the electronic device 400 is changed to a state of accessing the core network 420 and/or a condition in which the electronic device 400 is located in a designated location). The communication processor 507 may transmit the URSP rule to the URSP handler 504 in response to reception of the URSP rule from the core network 420. The URSP handler 504 may store the URSP rule received from the communication processor 507, and may use the URSP rule for setting up a PDU session.

According to various embodiments of the disclosure, the URSP rule may be information including elements capable of using a predetermined PDU session and the characteristic of the predetermined PDU session, and Table 3 shows an example of fields and data included in a URSP rule.

TABLE 3

| Field | Data |
|---|---|
| Traffic descriptor | The identifier (APP1) of the application 505 executed in the electronic device 400 The access address information (FQDN, IP address, port information, protocol information) of the first server 510, the second server 520, and/or the third server 530 that the electronic device 400 desires to access |
| Route Selection Descriptor(RSD) | The name (data network name (DNN)) of data network to which the electronic device 400 desires to access The name (data network name (DNN)) of network accessible via predetermined PDU session The identification information of a network slice usable by a predetermined PDU session Information (SSC mode 1, 2, 3) indicating the characteristic (e.g., continuity) of a service usable via a predetermined PDU session |

Referring to Table 3, the URSP rule may include a traffic descriptor field including at least one of the identifier (APP1) of the application 505 executed in the electronic device 400, and the access address information (a domain name (FQDN), an IP address, port information, and protocol information) of the first server 510, the second server 520, and the third server 530 that the electronic device 400 desires to access, and/or may include an RSD field including at least one of information (DNN) associated with a network usable by a predetermined PDU session, the identification information (S-NSSAI) of a network slice, and information (SSC mode 1, 2, 3) indicating the characteristic (e.g., continuity) of a service used via a predetermined PDU session.

According to various embodiments of the disclosure, the URSP handler 504 may identify whether the identification information of the EEC 503 is included in the URSP rule, in response to the fact that the EEC 503 is activated (or access to the edge network system 500 is requested). An operating system (e.g., the operating system 142 of FIG. 3) installed in the electronic device 400 may support at least one operation mode (e.g., a security mode, a game mode, and/or a business mode). At least some operation modes among the at least one operation mode may perform an edge network service, and the EEC 503 may be activated in response to activation of an operation mode capable of performing an edge network service. According to an embodiment, in response to activation of an operation mode capable of performing an edge network service among at least one operation mode supported by the operating system 142, the processor 501 may activate the EEC 503 corresponding to the activated operation mode. According to another embodiment, in response to activation of an operation mode capable of performing an edge network service, the EEC 503 may activate an operation mode corresponding to the activated operation mode among the at least one operation mode supported by the EEC 503. In response to activation of a predetermined operation mode, the URSP handler 504 may identify whether the identification information of the EEC 503 is included in the URSP rule.

The electronic device 400 may activate the EEC 503 in response to activation of an application capable of using an edge network service (or applications included in a predetermined group). The EEC 503 may be activated in response to activation of an application capable of performing an edge network service. In response to activation of a predetermined application, the URSP handler 504 may identify whether the identification information of the EEC 503 is included in the URSP rule.

The URSP handler 504 may identify the identification information of the EEC 503 and the identification information of the EEC 503 included in the URSP, in response to identification that the identification information of the EEC 503 is included in the URSP rule (or identification that only the identification information of the EEC is included in the traffic descriptor of the URSP).

According to various embodiments of the disclosure, the URSP handler 504 may set up a first PDU session based on PDU session configuration information included in the URSP, in response to accordance between the identification information of the EEC 503 and the identification information of the EEC 503 included in the URSP. The PDU session configuration information may be an RSD included in the URSP rule. The first PDU session may be a dedicated session via which the electronic device 400 is connected to the edge network system 500 and exchanges data.

The URSP handler 504 may set up the first PDU session based on the PDU session configuration information included in a TD which has a high priority among a plurality of TDs, in response to the fact that the identification information of the EEC 503 is included in a plurality of TDs.

According to various embodiments of the disclosure, the URSP handler 504 may transmit a message indicating that the first PDU session is set up to the EEC 503 in response to the setup of the first PDU session.

According to various embodiments of the disclosure, the EEC 503 may access the first server 510 via the first PDU session and may perform a provisioning procedure with the first server 510, in response to the setup of the first PDU session. Via the provisioning procedure, the EEC 503 may receive, from the first server 510, the access information of at least one second server 520 managed by the first server 510. The EEC 503 may identify at least one second server 520 included in the access information of the second server 520, and may select the second server 520 to access.

According to various embodiments of the disclosure, the EEC 503 may access the second server 520 via the first PDU session based on the access information of the selected second server 520. The EEC 503 may transmit, to the second server 520, an edge service discovery request message that requests the access information of at least one third server 530 connected to the second server 520. The second server 520 may transmit, to the EEC 503, an edge service discovery response message including the access information of the third server 530 that is stored in the second server 520.

According to various embodiments of the disclosure, the EEC 503 may search for the third server 530 capable of providing a service usable by the application 505, from the access information of the third server 530, in response to reception of a request for connecting a service using the third server 530 from the application 505. The EEC 503 may identify an application identifier (e.g., com.android.app1) that is identical to an application identifier (e.g., com.android.app1) to be used by the application 505 among application identifiers (e.g., com.android.app1 and com.android.app2) included in the identifier of the third server 530, and may transmit the access address information (e.g., a domain name (e.g., app1.edge.com) or an IP address (e.g., 3.3.3.1)) of the third server 530 corresponding to the identified application identifier (e.g., com.android.app1) to the application 505. The EEC 503 may set up the connection between the application 505 and the third server 530 via the first PDU session. The application 505 may perform connection to the third server 530 based on the received domain name of the third server 30 or IP address, and may perform a service using the third server 530.

According to various embodiments of the disclosure, the URSP handler 504 may identify whether the identification information of the EEC 503 is included in the URSP, in response to the fact that the EEC 503 is activated (or access to the edge network system 500 is requested). The URSP handler 504 may transmit, to the EEC 503, a message including information associated with the second PDU session set up in advance, in response to identification that the identification information of the EEC 503 is not included in the URSP rule (or the identification information of the EEC 503 and the access address information of the second server 520 are included in the URSP). The EEC 503 may access the first server 510 via the second PDU session, and may perform a provisioning procedure with the first server 510. The second PDU session is a session different from the first PDU session, and may be a PDU session set up in advance by the electronic device 400 in order to exchange data with the server 430. For example, the second PDU session may be a PDU session configured for a network (default network) that the electronic device 400 basically uses, or a PDU session set up based on a URSP rule which is before updating. The first PDU session may be a dedicated PDU session usable by an application capable of performing an edge service, and the second PDU session may be a general-purpose PDU session usable by an application capable of performing an edge service and a non-edge service.

According to various embodiments of the disclosure, the EEC 503 may access the first server 510 via the second PDU session, and may perform a provisioning procedure with the first server 510. Via the provisioning procedure, the EEC 503 may receive, from the first server 510, the access information of the second server 520 managed by the first server 510. The EEC 503 may identify at least one second server 520 included in the access information of the second server 520, and may select the second server 520 to access.

According to various embodiments of the disclosure, the URSP handler 504 may identify the access address information of the selected second server 520 (e.g., the domain address of the second server 520). The URSP handler 504 may identify whether the access address information (e.g., a domain address and/or IP address) of the second server 520 is included in the URSP rule, and may set up a first PDU session based on PDU session configuration information included in the URSP rule in response to identification that the access address information of the second server 520 is included in the URSP rule. The PDU session configuration information may be an RSD included in the URSP rule. The first PDU session may be a dedicated session via which the electronic device 400 is connected to the edge network system 500 and exchanges data.

According to various embodiments of the disclosure, the EEC 503 may access the second server 520 via the first PDU session in response to the setup of the first PDU session. The EEC 503 may transmit, to the second server 520, an edge service discovery request message that requests the access information of at least one third server 530 connected to the second server 520. The second server 520 may transmit, to the EEC 503, an edge service discovery response message including the access information of the third server 530 that is stored in the second server 520.

According to various embodiments of the disclosure, the EEC 503 may search for the third server 530 capable of providing a service usable by the application 505, from the access information of the third server 530, in response to reception of a request for connecting a service using the third server 530 from the application 505. The EEC 503 may identify an application identifier (e.g., com.android.app1) that is identical to an application identifier (e.g., com.android.app1) to be used by the application 505 among application identifiers (e.g., com.android.app1 and com.android.app2) included in the identifier of the third server 530, and may transmit the access address information (e.g., a domain name (e.g., app1.edge.com) or an IP address (e.g., 3.3.3.1)) of the third server 530 corresponding to the identified application identifier (e.g., com.android.app1) to the application 505. The EEC 503 may set up a connection between the application 505 and the third server 530 via the first PDU session. The application 505 may perform connection to the third server 530 based on the received domain name of the third server 530 or IP address, and may perform a service using the third server 530.

According to various embodiments of the disclosure, the URSP handler 504 may identify whether the access address information (e.g., a domain name) of the second server 520 is included in the URSP rule, and in response to the identification that the access address information (e.g., a domain name) of the second server 520 is not included in the URSP rule, may identify whether the configuration information of a first PDU session is included in the access information of the second server 520.

According to various embodiments of the disclosure, in response to the fact that the configuration information of the first PDU session is included in the access information of the second server 520, the URSP handler 504 may set up the first PDU session based on the PDU session configuration information included in the access information of the second server 520. In response to the setup of the first PDU session, the URSP handler 504 may transmit a message indicating that the first PDU session is set up to the EEC 503. Since the first PDU session is set up, the EEC 503 may perform a discovery procedure with the second server 520.

According to various embodiments of the disclosure, the URSP handler 504 may enable the second server 520 and the EEC 503 to be connected via a second PDU session, in response to the fact that the configuration information of the first PDU session is not included in the access information of the second server 520. The EEC 503 may perform a discovery procedure with the second server 520 via the second PDU session.

According to various embodiments of the disclosure, in the state of being connected to the second PDU session, in response to the fact that activation of the application 505 is detected (or the fact that the activated application receives a request for setting up a connection to the third server 530), the URSP handler 504 may identify whether the identification information of the activated application 505 is included in the URSP. In response to the fact that the identification information of the activated application is included in the URSP, the URSP handler 504 may set up a first PDU session based on the PDU session configuration information included in the URSP, and the EEC 503 may set up a connection between the application 505 and the third server 530 via the first PDU session.

According to various embodiments of the disclosure, in the state of being connected to the second PDU session, in response to reception of a signal requesting the query of the domain address of the third server 530 from the application 505, the URSP handler 504 may identify whether the domain address of the third server 530 is included in the URSP. The URSP handler 504 may set up a first PDU session based on PDU session configuration information included in the URSP, in response to the fact that the domain address of the third server 530 is included in the URSP, and the EEC 503 may set up a connection between the application 505 and the third server 530 via the first PDU session.

According to various embodiments of the disclosure, the URSP may further include location information at which a predetermined PDU session (e.g., the first PDU session) is capable of being used. In this instance, the URSP handler 504 may take into consideration the location of the electronic device 400, when setting up the first PDU session. According to an embodiment, the URSP handler 504 may compare the location information included in the URSP and the location of the electronic device 400, and may set up a first PDU session in response to identification that the location of the electronic device 400 is a location disposed within a designated distance from the location information included in the URSP. Since the first PDU is set up, the EEC 503 may perform a provisioning procedure with the edge network system 500, a discovery procedure, and/or connection between the application 505 and the third server 530.

As described above, the EEC 503 of the electronic device 400 according to various embodiments of the disclosure may set up a PDU session for accessing the edge network system 500 based on the URSP rule received from the core network 420 and the access information of the second server 520 (or the access information of the third server 530) received from the edge network system 500. Therefore, even in the situation in which the edge network system 500 does not have PDU session configuration information and the core network 420 does not have change information of the edge network system 500, the electronic device 400 may be connected to the edge network system 500 via a PDU session for accessing the edge network system 500, and may perform a service.

Figure 6:
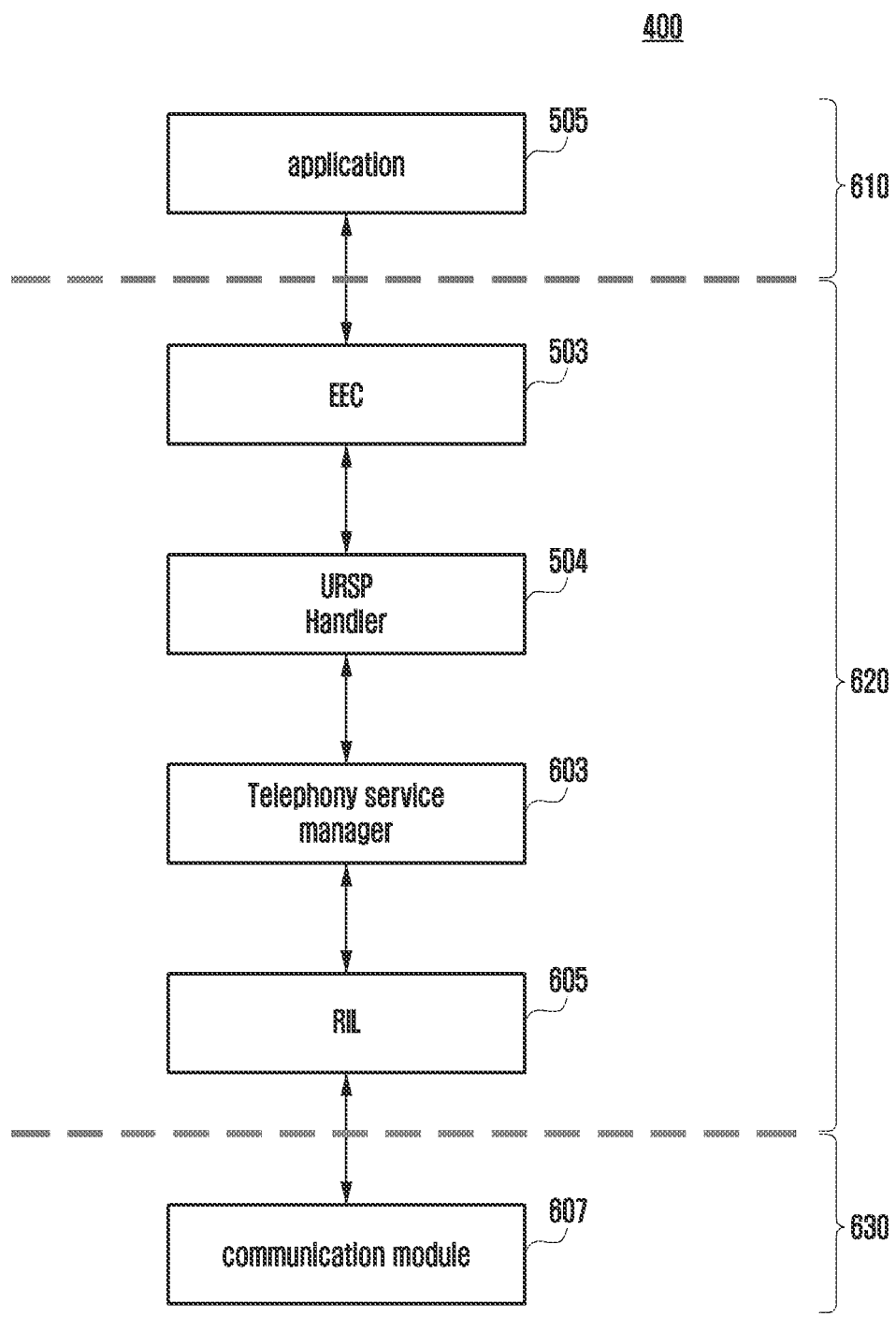
FIG. 6 is a diagram illustrating an electronic device according to an embodiment of the disclosure.

FIG. 6 is a diagram illustrating an electronic device according to an embodiment of the disclosure.

Referring to FIG. 6, an electronic device 400 may include an application layer 610, a framework layer 620, and/or a hardware layer 630.

According to various embodiments of the disclosure, the application layer 610 may include the application 505 capable of performing a service using an edge network system (e.g., the edge network system 500 of FIG. 4).

According to various embodiments of the disclosure, the hardware layer 630 may include a communication module 607 (e.g., the wireless communication module 192 of FIG. 1). The communication module 607 may exchange data with a server (e.g., the server 430 of FIG. 5) and/or the edge network system 500 according to control performed by a communication processor (e.g., the communication processor 507 of FIG. 5).

According to various embodiments of the disclosure, the framework layer 620 may be a layer implemented between the application layer 610 and the hardware layer 630, and may include elements that process a request from the application 505 using an element (e.g., the communication module 607) implemented in the hardware layer 630, and transmit a processed result to the application 505.

According to various embodiments of the disclosure, the framework layer 620 may include the EEC 503, a URSP handler (e.g., the URSP handler 504 of FIG. 5), a telephony service manager 603, and/or a radio interface layer (RIL) 605.

According to various embodiments of the disclosure, at least some elements among the elements included in the application layer 610 and/or the framework layer 620 may operate according to control performed by an application processor (e.g., the processor 501 of FIG. 5).

According to various embodiments of the disclosure, the URSP handler 601 may receive a URSP rule transmitted from a core network (e.g., the core network 420 of FIG. 5) via the communication module 607 (or the telephony service manager 603, the communication processor (e.g., the communication processor 507 of FIG. 5)). The URSP handler 504 may control the telephony service manager 603 so as to set up a first PDU session based on the URSP rule.

According to various embodiments of the disclosure, the URSP handler 504 may store and/or manage a URSP rule. The URSP handler 504 may set up, based on the URSP rule, a first PDU session for connecting to the edge network system 500. The URSP handler 504 may transmit the first PDU session configuration information (which may be included in the URSP rule or the access information of the second server) to the telephony service manager 603, when setting up the first PDU session.

According to various embodiments of the disclosure, the telephony service manager 603 may receive the configuration information of the first PDU session from the URSP handler 601, and may set up and/or manage a connection between the application 505 and the edge network system 500 (or the third server 530). The telephony service manager 603 may transmit the configuration information of the first PDU session to the RIL 605.

According to various embodiments of the disclosure, the RIL 605 may transmit the configuration information of the first PDU session received from the telephony service manager 603 to the communication module 607. The communication module 607 may set up the first PDU session based on the configuration information of the first PDU session, and may set up a connection between the application 505 and the third server 530. The application 505 may be connected to the third server 530 via the first PDU session, and may perform a service provided by the third server 530.

Figure 7:
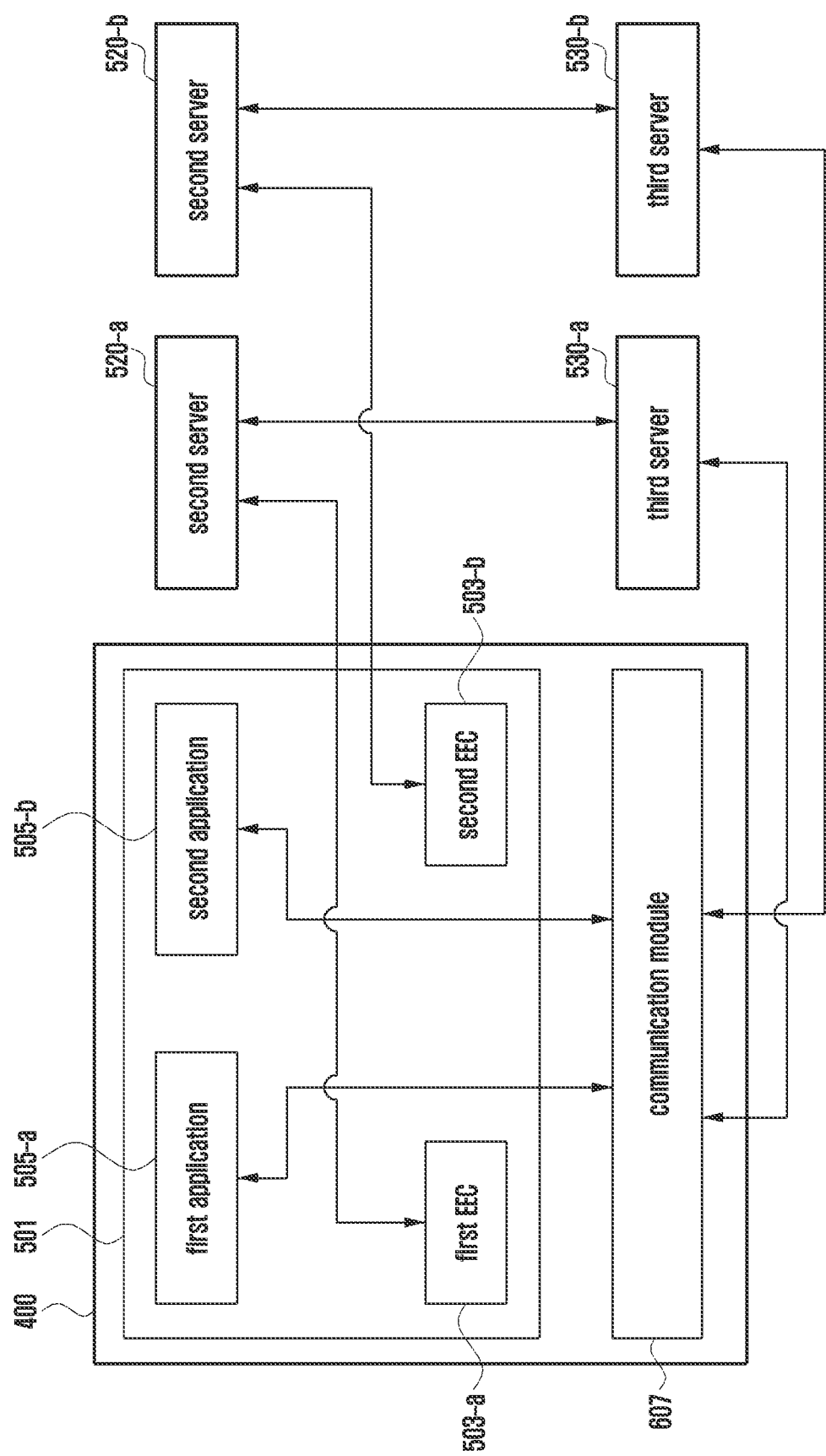
FIG. 7 is a diagram illustrating an embodiment in which an electronic device sets up a PDU session to be used by an application, according to an EEC or a plurality of operation modes supported by the EEC, according to an embodiment of the disclosure.

FIG. 7 is a diagram illustrating an embodiment in which an electronic device sets up a PDU session to be used by an application, according to an EEC or a plurality of operation modes supported by the EEC, according to an embodiment of the disclosure.

Referring to FIG. 7, according to various embodiments of the disclosure, an electronic device 400 may include a processor 501 (e.g., a processor 120 of FIG. 1), a memory (e.g., a memory 130 of FIG. 1), and/or a communication module 607.

The memory 130 may store various program modules executable on the processor 501. The memory 130 may store an application 505 (e.g., the application 146 of FIG. 1) capable of executing a service using the edge network system 500 and various elements (e.g., an edge enabler client (EEC) 503) for supporting edge computing. The processor 501 may load and execute (or operate) various program modules (e.g., the EEC 503, the application 505) stored in the memory 130.

According to various embodiments of the disclosure, the memory 130 may store a plurality of applications 505-a and 505-b capable of using a service via an edge network system (e.g., the edge network system 500 of FIG. 5). It is assumed that among the plurality of applications 505-a and 505-b, the first application 505-a is an application capable of using an edge service via a third server 530-a, and the second application 505-b is an application capable of using an edge service via a third server 530-b.

According to various embodiments of the disclosure, the electronic device 400 may differently set an authority associated with resources of a system accessible by the first application 505-a and the second application 505-b (e.g., the authority to use the processor 501, the EEC 503, and/or the communication module 607).

For example, in the state in which the EEC 503 is implemented as a plurality of EEC 503-a and 503-b, the electronic device 400 may set the first application 505-a to use the first EEC 503-a, and may set the second application 505-b to use the second EEC 503-b. The electronic device 400 may set the first application 505-a not to use the second EEC 503-b, and may set the second application 505-b not to use the first EEC 503-a. The plurality of EECs 503-a and 503-b may have different identification information (EEC ID) from each other.

According to various embodiments of the disclosure, the electronic device 400 may activate an EEC corresponding to a predetermined application, in response to activation of the predetermined application. For example, the electronic device 400 may activate the first EEC 503-a in response to the activation of the first application 505-a. As another example, the electronic device 400 may activate the second EEC 503-b in response to the activation of the second application 505-b.

According to various embodiments of the disclosure, the activated EEC (e.g., the first EEC 503-a) may perform a provisioning procedure with the edge network system 500, a discovery procedure, and/or setup of a connection between the activated application (e.g., the first application 505-a) and the third server 530-a via one of a first PDU session or a second PDU session based on a URSP.

According to another embodiment, although not illustrated, in the state of being implemented as a single entity, the EEC 503 may support a plurality of operation modes including a first operation mode and a second operation mode. The first operation mode may be an operation mode in which the first application 505-a performs a service provided by the edge network system 500, and the second operation mode may be an operation mode in which the second application 505-b performs a service provided by the edge network system 500. A memory area (e.g., a logical or physical memory address area) that the EEC 503 operating in the first operation mode uses may be logically or physically separated from a memory area that the EEC 503 operating in the second operation mode uses, and the EEC 503 operating in the first operation mode may not access the memory area that the EEC 503 operating in the second operation mode uses.

According to various embodiments of the disclosure, the electronic device 400 may store, in advance, the identification information of the second server 520-*a* capable of using a predetermined operation mode among a plurality of operation modes supported by an operating system (e.g., the operating system 142 of FIG. 3), or the first application 505-*a* (or an application group including the first application 505-*a*). The identification information of the second server 520-*a* may include service provider information that operates the second server 520-*a* and/or the access address information of the second server 520-*a* (e.g., the domain name and/or IP address of the second server 520-*a*). The electronic device 400 may store, in advance, the identification information of the second server 520-*b* capable of using another predetermined operation mode among the plurality of operation modes supported by the operating system 142, or the second application 505-*b* (or an application group including the second application 505-*b*). The identification information of the second server 520-*b* may include service provider information that operates the second server 520-*b* and/or the access address information of the second server 520-*b* (e.g., the domain name and/or IP address of the second server 520-*b*). The identification information of the second servers 520-*a* and 520-*b* may be used when the electronic device 400 selects a second server to be connected for performing an edge service.

According to various embodiments of the disclosure, if the EEC 503 is implemented as a plurality of EECs 503-*a* and 503-*b*, the electronic device 400 may store, in the memory 130, data in which the identification information of the second server 520-*a* and 520-*b* received via a provisioning procedure and the identification information of the EEC 503-*a* and 503-*b* accessible to the second server are mapped. If the EEC 503 supports a plurality of operation modes, the electronic device 400 may store, in the memory 130, data in which the identification information of the second server 520-*a* and 520-*b* received via a provisioning procedure and the identification information of a plurality of operation modes accessible to the second server (e.g., a business operation mode, a personal operation mode, a game operation mode, or an operation mode provided by a predetermined operator) are mapped.

According to various embodiments of the disclosure, the mapped data may be stored in the memory 130 via various schemes. For example, the electronic device 400 may receive the mapped data together with the identification information of the second server 520 via the provisioning procedure.

According to various embodiments of the disclosure, in the state in which a first operation mode is activated, the electronic device 400 may receive the access information of the second server 520-*a* and 520-*b* via a provisioning procedure with the edge network system 500. The access information of the second server 520-*a* and 520-*b* may include the identification information of at least one second server 520 (e.g., the information associated with a service provider that operates the second server 520).

The electronic device 400 may identify the identification information of the second server 520-*a* and 520-*b* received via the provisioning procedure, and may identify the second server 520-*a* usable in the first operation mode based on the data in which the identification information of the second server 520-*a* and 520-*b* and the identification information of a plurality of operation modes accessible to the second server are mapped. The electronic device 400 may receive the access information of the third server 530-*a* via a discovery procedure with the second server 520-*a* usable in the first operation mode. The electronic device 400 may set up a connection between the first application 505-*a* and the third server 530-*a* based on the access information of the third server 530-*a*.

According to various embodiments of the disclosure, in the state in which the second operation mode is activated, the electronic device 400 may receive the access information of the second server 520-*a* and 520-*b* via a provisioning procedure with the edge network system 500. The access information of the second server 520-*a* and 520-*b* may include the identification information of the at least one second server 520-*a* and 520-*b* (e.g., the identifier of the second server 520 and information associated with a service provider that operates the second server 520) and/or the access address information of the second server 520-*a* and 520-*b*.

The electronic device 400 may identify the identification information of the second server 520-*a* and 520-*b* received via the provisioning procedure, and may identify the second server 520-*b* usable in the second operation mode based on the data in which the identification information of the second server 520-*a* and 520-*b* and the identification information of a plurality of operation modes accessible to the second server are mapped. The electronic device 400 may receive the access information of the third server 530-*b* via the discovery procedure with the second server 520-*b* usable in the second operation mode. The electronic device 400 may set up a connection between the second application 505-*b* and the third server 530-*b* based on the access information of the third server 530-*b*.

According to various embodiments of the disclosure, the first EEC 503-*a* and/or the second EEC 503-*b* may exchange data with the second server 520-*a* and 520-*b* via the communication module 607.

Figure 8:
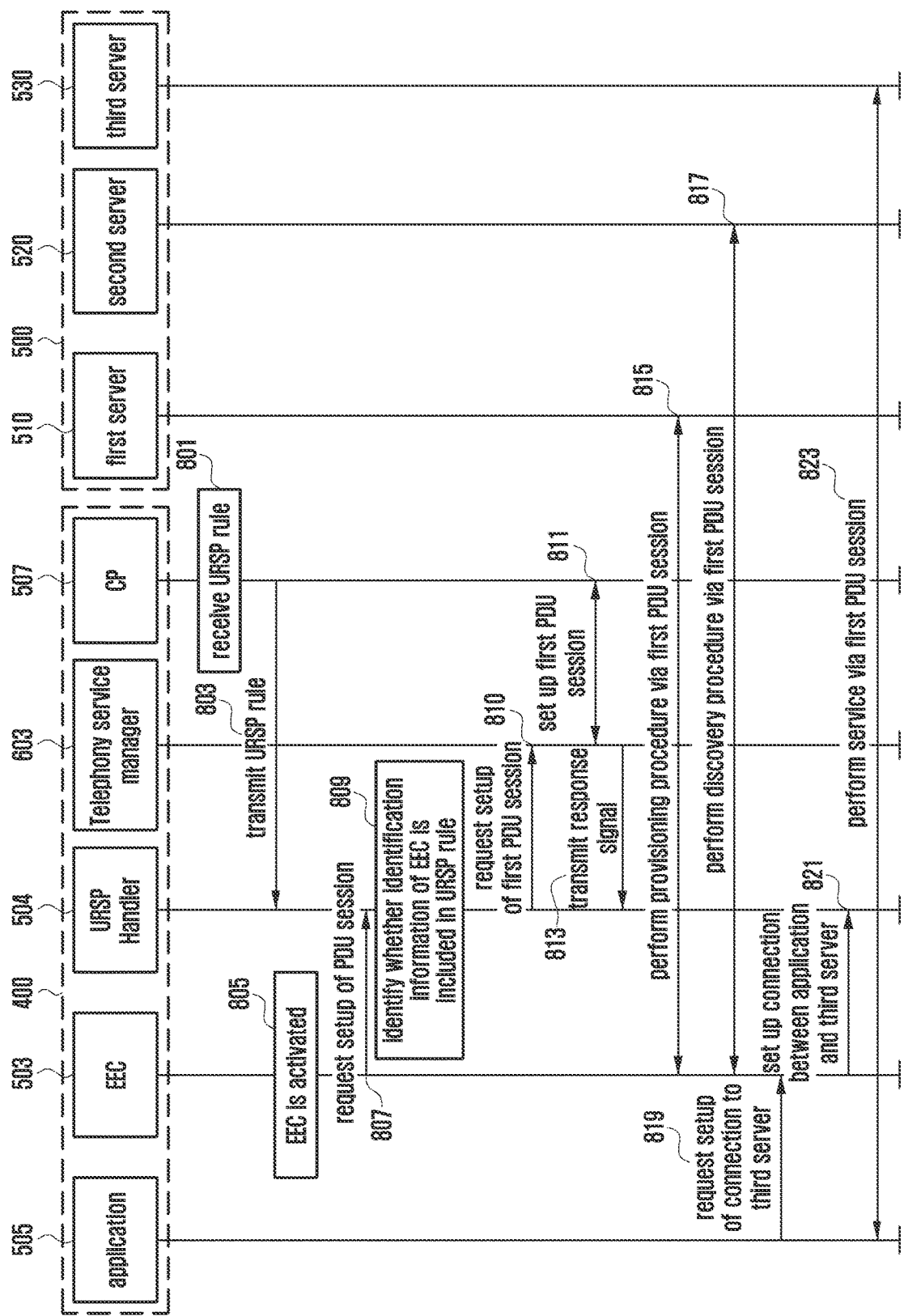
FIG. 8 is a diagram illustrating a procedure in which an electronic device performs an edge service via a PDU session set up according to a URSP, according to an embodiment of the disclosure.

FIG. 8 is a diagram illustrating an edge service performing procedure performed by an electronic device via a PDU session set up according to a URSP, according to an embodiment of the disclosure.

Referring to FIG. 8, according to various embodiments of the disclosure, in operation 801, a communication processor 507 may receive a URSP from a core network (e.g., a core network 420 of FIG. 5).

According to various embodiments of the disclosure, a URSP rule may include information related to a PDU session operation policy. The URSP rule may include information related to an element which is capable of using a predetermined PDU session (e.g., the identification information of the application of FIG. 5, the identification information of the EEC 503) and/or information related to an element which is accessible via a predetermined PDU session (e.g., the identification information of the first server 510, the second server 520, and/or the third server 530 of FIG. 4, the access address information of the first server 510, the second server 520, and/or the third server 530 (e.g., the IP address, port number, or protocol information of the first server 510, the second server 520, and/or the third server 530), and the domain name of the first server 510, the second server 520, and/or the third server 530). The information related to an element capable of using a predetermined PDU session may be included in the traffic descriptor field of the URSP rule. For example, the traffic descriptor field may include the identification information (e.g., OSId, OSAppId) of an application that accesses a predetermined server (e.g., the first server 510, the second server 520, and/or the third server 530), the access address information of a predetermined server (e.g., an IP address, a port number, protocol information, a domain name), and/or the name (data network name (DNN)) of a network accessed via a predetermined PDU session.

According to various embodiments of the disclosure, the URSP rule may include information including the characteristic of a predetermined PDU session. The characteristic of the predetermined PDU session may include various types of information including the list of the names (data network name (DNN)) of networks accessible via the predetermined PDU session, single network slice selection assistance information (S-NSSAI) indicating the identification information of a network slice used by the predetermined PDU session, and/or information (service session continuity (SSC mode)) indicating a mode related to continuity of a connection of the predetermined PDU session. The information including the characteristic of the predetermined PDU session may be included in the route selection descriptor field of the URSP rule. The information including the predetermined PDU session may be information needed for the electronic device 400 to set up the predetermined PDU session (e.g., produce, identify, and/or select the predetermined PDU session). The information including the characteristic of the predetermined PDU session may include the valid time (time window) of the predetermined PDU session and the location information at which the access to the predetermined PDU session is available.

According to various embodiments of the disclosure, in operation 803, the communication processor 507 may transmit the URSP received from the core network 420 to the URSP handler 504.

According to various embodiments of the disclosure, in operation 805, the URSP handler 504 may detect the activation of the EEC 503.

According to various embodiments of the disclosure, an operating system (e.g., the operating system 142 of FIG. 3) installed in the electronic device 400 may support at least one operation mode (e.g., a normal or default mode, a security mode, a game mode, and/or business mode). At least some operation modes among the at least one operation mode may perform an edge network service, and the EEC 503 may be activated in response to activation of an operation mode capable of performing an edge network service. In response to activation of a predetermined operation mode, the URSP handler 504 may identify whether the identification information of the EEC 503 is included in the URSP rule.

The electronic device 400 may activate the EEC 503 in response to activation of an application capable of using an edge network service (or applications included in a predetermined group). The EEC 503 may be activated in response to activation of an application capable of performing an edge network service. In response to activation of a predetermined application, the URSP handler 504 may identify whether the identification information of the EEC 503 is included in the URSP.

According to various embodiments of the disclosure, in operation 807, the EEC 503 may transmit a signal for requesting setup of a first PDU session to the URSP handler 504.

According to various embodiments of the disclosure, in operation 809, the URSP handler 504 may identify whether the identification information of the EEC 503 is included in the URSP rule, in response to reception of the signal that requests the setup of a PDU session. The URSP handler 504 may identify the identification information of the EEC 503 and the identification information of the EEC 503 included in the URSP rule, in response to identification that the identification information of the EEC 503 is included in the URSP rule (or identification that only the identification information of the EEC is included in the traffic descriptor of the URSP rule). The URSP handler 504 may perform a series of operations for setting up a first PDU session based on PDU session configuration information included in the URSP rule, in response to accordance between the identification information of the EEC 503 and the identification information of the EEC 503 included in the URSP rule. The PDU session configuration information may be an RSD included in the URSP rule. The first PDU session may be a dedicated session via which the electronic device 400 is connected to the edge network system 500 and exchanges data.

The URSP handler 504 may transmit first PDU session configuration information included in the received URSP to the telephony service manager 603, and may control the telephony service manager 603 to set up the first PDU session.

According to various embodiments of the disclosure, in operation 810, the URSP handler 504 may transmit a request for setup of the first PDU session to the telephony service manager 603.

According to various embodiments of the disclosure, in operation 811, the telephony service manager 603 and the communication processor 507 may set up the first PDU session based on the configuration information of the first PDU session.

The setup of the first PDU session may include establishment of the first PDU session. If the first PDU session is already set up, the telephony service manager 603 may transmit, to the URSP handler 504, information associated with the first PDU session that already exists. The telephony service manager 603 may transmit the configuration information of the first PDU session to the communication processor 507 via an RIL (e.g., the RIL 605 of FIG. 6). The communication processor 507 may set up the first PDU session using the configuration information of the first PDU session.

According to various embodiments of the disclosure, in operation 813, the telephony service manager 603 may transmit a response message indicating that the setup of the first PDU session is completed to the URSP handler 504.

According to various embodiments of the disclosure, the EEC 503 may perform a provisioning procedure with the first server 510 via the first PDU session in operation 815.

According to various embodiments of the disclosure, the EEC 503 may access the first server 510 via the first PDU session, and may perform a provisioning procedure with the first server 510, in response to the setup of the first PDU session. Via the provisioning procedure, the EEC 503 may receive, from the first server 510, the access information of at least one second server 520 managed by the first server 510. The EEC 503 may identify at least one second server 520 included in the access information of the second server 520, and may select the second server 520 to access.

According to various embodiments of the disclosure, the EEC 503 may perform a discovery procedure with the second server 520 via the first PDU session in operation 817.

According to various embodiments of the disclosure, the EEC 503 may access the second server 520 via the first PDU session based on the access information of the selected second server 520. The EEC 503 may transmit, to the second server 520, an edge service discovery request message that requests the access information of at least one third server 530 connected to the second server 520. The second server 520 may transmit, to the EEC 503, an edge service discovery response message including the access information of the third server 530 that is stored in the second server 520.

According to various embodiments of the disclosure, in operation 819, the EEC 503 may receive, from the application 505, a request for setting up a connection to the third server 530.

According to various embodiments of the disclosure, the request for setting up the connection to the third server 530 may include an operation of requesting the domain name of the third server 530 included in the access address information of the third server 530. A service that uses the third server 530 may be an edge computing service using the edge network system 500. The application 505 may be an application capable of using an edge computing service. The EEC 503 may select the third server 530 to access, based on comparison between the identification information of the application 505 and the identifier (ACID) of an application of the third server 530 included in the access information of the third server 530. According to various embodiments of the disclosure, the EEC 503 may search for the third server 530 capable of providing a service usable by the application 505, from the access information of the third server 530, in response to reception of a request for connecting a service using the third server 530 from the application 505. The EEC 503 may identify an application identifier (e.g., com.android.app1) that is identical to an application identifier (e.g., com.android.app1) to be used by the application 505 among application identifiers (e.g., com.android.app1 and com.android.app2) included in the identifier of the third server 530, and may transmit the domain name (e.g., app1.edge.com) or IP address (e.g., 3.3.3.1) of the third server 530 corresponding to the identified application identifier (e.g., com.android.app1) to the application 505.

According to various embodiments of the disclosure, although not receiving the request for setting up the connection to the third server 530 from the application 505, the EEC 503 may search for the third server 530. According to an embodiment, if execution of an application included in an application list included in the access information of the third server 530 is detected, the EEC 503 may search for the third server 530. According to an embodiment, if occurrence of traffic related to an application included in an application list included in the access information of the third server 530 is detected, the EEC 503 may search for the third server 530. According to an embodiment, the EEC 503 may search for the third server 530, in response to reception of a request for accessing the third server 530 included in the access information of the third server 530.

According to various embodiments of the disclosure, in operation 821, the EEC 503 may set up a connection between the application 505 and the third server 530.

According to various embodiments, a method of performing configuration so that the EEC 503 sets up a connection between the application 505 and the third server 530 may include a method of performing configuration so that the application 505 communicates with an application installed in the third server 530 by transferring the access information of the third server 530 to the application 505. For example, the EEC 503 may transmit the access address information of the third server 530 and the identification information of the application 505 to the URSP handler 504. The URSP handler 504 may set up a first PDU session based on the identification information of the application 505 and the access address information of the third server 530, so that the application 505 uses the first PDU session. According to an embodiment, the URSP handler 504 may perform configuration so that the application 505 and the third server 530 are connected via the first PDU session. The data that the application 505 transmits or receives may be transmitted via the first PDU session. The EEC 503 may transmit, to the application 505, a response message including the access address information of the server application (e.g., the IP address of the server application) in response to a domain name system (DNS) query request of the client application (e.g., application 505). The application 505 may be configured to communicate with an application of the third server 530 based on the access information of the server application.

According to various embodiments of the disclosure, the electronic device 400 (or the processor 501) may set up the connection between the application 505 and the third server 530 so that the application 505 and the third server 530 exchange data via the first PDU session.

According to various embodiments of the disclosure, the application 505 may be connected to the third server 530 via the first PDU session, and may perform a service in operation 823.

Figure 9:
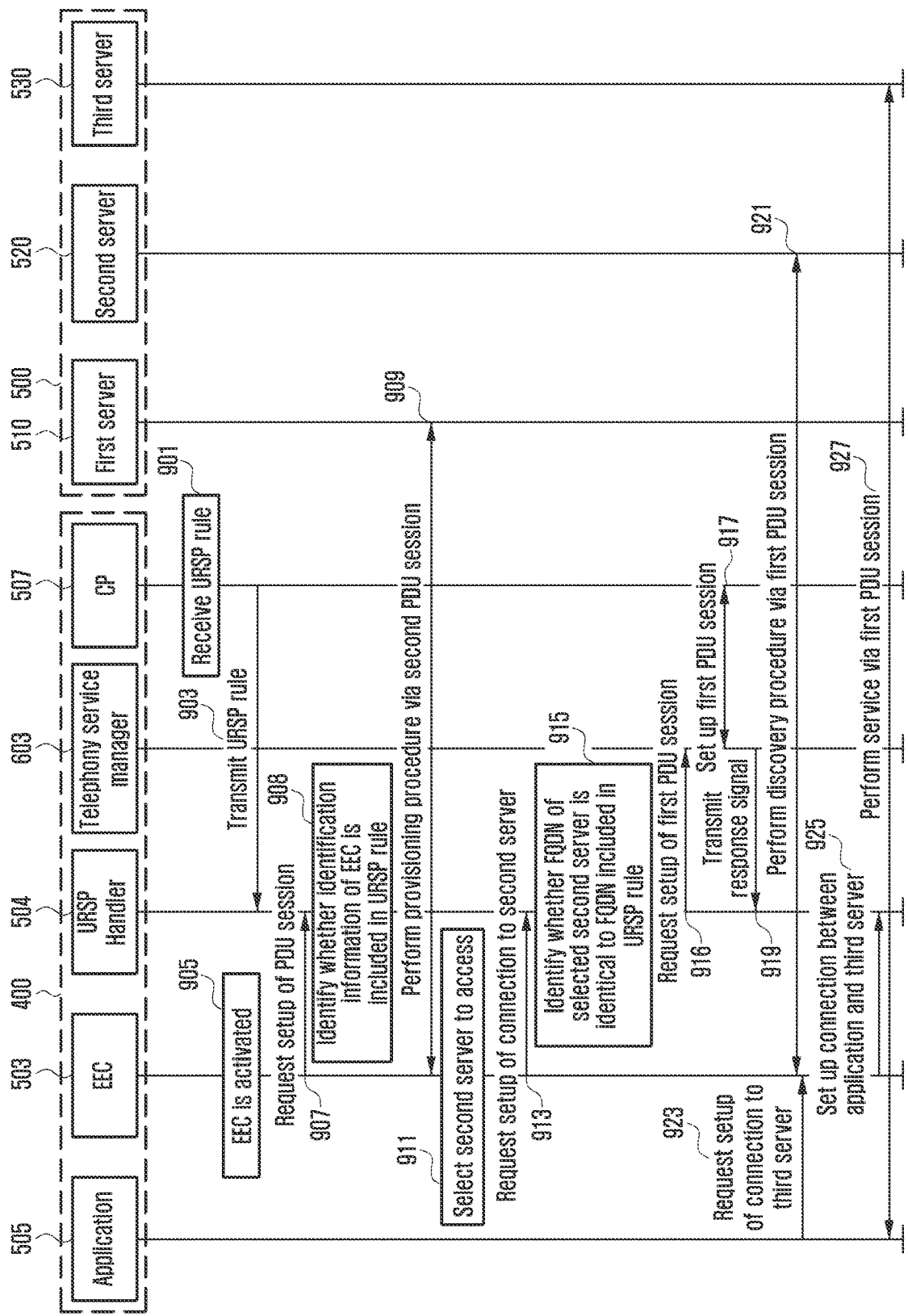
FIG. 9 is a diagram illustrating a procedure in which an electronic device performs an edge service via a PDU session set up according to a URSP, according to an embodiment of the disclosure.

FIG. 9 is a diagram illustrating an edge service performing procedure performed by an electronic device via a PDU session set up according to a URSP, according to an embodiment of the disclosure.

Referring to FIG. 9, according to various embodiments of the disclosure, in operation 901, a communication processor 507 may receive a URSP rule from a core network (e.g., a core network 420 of FIG. 5).

According to various embodiments of the disclosure, the URSP rule may include information related to a PDU session operation policy. The URSP rule may include information related to an element which is capable of using a predetermined PDU session (e.g., the identification information of the application 505 of FIG. 5, the identification information of the EEC 503) and/or information related to an element which is accessible via a predetermined PDU session (e.g., the identification information of the first server 510, the second server 520, and/or the third server 530 of FIG. 4, the access address information of the first server 510, the second server 520, and/or the third server 530 (e.g., the IP address, port number, or protocol information of the first server 510, the second server 520, and/or the third server 530), and the domain name of the first server 510, the second server 520, and/or the third server 530). The information related to an element capable of using a predetermined PDU session may be included in the traffic descriptor field of the URSP rule. For example, the traffic descriptor field may include the identification information (e.g., OSId, OSAppId) of an application that accesses a predetermined server (e.g., the first server 510, the second server 520, and/or the third server 530), the access address information of a predetermined server (e.g., an IP address, a port number, protocol information, a domain name), and/or the name (data network name (DNN)) of a network accessed via the predetermined PDU session.

According to various embodiments of the disclosure, the URSP rule may include information including the characteristic of a predetermined PDU session. The characteristic of the predetermined PDU session may include various types of information including the list of the names (data network name (DNN)) of networks accessible via the predetermined PDU session, single network slice selection assistance information (S-NSSAI) indicating the identification information of a network slice used by the predetermined PDU session, and/or information (service session continuity (SSC mode)) indicating a mode related to continuity of the connection of the predetermined PDU session.

The information including the characteristic of the predetermined PDU session may be included in the route selection descriptor field of the URSP rule. The information including the predetermined PDU session may be information needed for the electronic device 400 to set up the predetermined PDU session (e.g., produce, identify, and/or select the predetermined PDU session). The information including the characteristic of the predetermined PDU session may include the valid time (time window) of the predetermined PDU session and the location information at which the access to the predetermined PDU session is available.

According to various embodiments of the disclosure, in operation 903, the communication processor 507 may transmit the URSP rule received from the core network 420 to the URSP handler 601.

According to various embodiments of the disclosure, in operation 905, the EEC 503 may detect the activation of the EEC 503.

According to various embodiments of the disclosure, in operation 907, the EEC 503 may transmit a request for setup of a PDU session to the URSP handler 504.

According to various embodiments of the disclosure, in operation 908, the URSP handler 504 may identify whether the identification information of the EEC 503 is included in the URSP rule, in response to reception of the signal that requests setup of a PDU session.

According to various embodiments of the disclosure, the URSP handler 504 may identify whether the identification information of the EEC 503 is included in the URSP rule, in response to the fact that the EEC 503 is activated (or access to the edge network system 500 is requested). The URSP handler 504 may perform a series of procedures using a second PDU session, in response to identification that the identification information of the EEC 503 is not included in the URSP rule (or the identification information of the EEC 503 and the domain address of the second server 520 are included in the traffic descriptor). The second PDU session is a session different from the first PDU session, and may be a PDU session set up in advance by the electronic device 400 in order to exchange data with the server 430. For example, the second PDU session may be a PDU session configured for a network (default network) that the electronic device 400 basically uses, or a PDU session set up based on a URSP rule which is before updating. The first PDU session may be a dedicated PDU session usable by an application capable of performing an edge service, and the second PDU session may be a general-purpose PDU session usable by an application capable of performing an edge service and a non-edge service.

According to various embodiments of the disclosure, the EEC 503 may perform a provisioning procedure with the first server 510 via the second PDU session in operation 909.

According to various embodiments of the disclosure, the EEC 503 may access the first server 510 via the second PDU session, and may perform a provisioning procedure with the first server 510. Via the provisioning procedure, the EEC 503 may receive, from the first server 510, the access information of the second server 520 managed by the first server 510.

According to various embodiments of the disclosure, in operation 911, the EEC 503 may identify at least one second server 520 included in the access information of the second server 520, and may select the second server 520 to access.

According to various embodiments of the disclosure, the EEC 503 may identify the domain address (fully qualified domain name, FQDN) of the selected second server 520 based on the access information of the second server 520.

The EEC 503 may identify whether the domain address of the second server 520 is present in the URSP.

According to various embodiments of the disclosure, in operation 913, the EEC 503 may transmit, to the URSP handler 504, a request for setting up a connection to the second server 520 for accessing the selected second server 520.

According to various embodiments of the disclosure, the request for setting up the connection to the second server 520 may include the access address information of the second server 520.

According to various embodiments of the disclosure, in operation 915, the URSP handler 504 may identify whether the domain address of the selected second server 520 is identical to the domain address of the second server 520 included in the URSP. The URSP handler 504 may perform a series of operations for setting up a first PDU session based on PDU session configuration information included in the URSP, in response to accordance between the domain address of the selected second server 520 and the domain address of the second server 520 included in the URSP.

According to various embodiments of the disclosure, in operation 916, the URSP handler 504 may transmit a signal for requesting setup of the first PDU session to the telephony service manager 603.

The URSP handler 504 may transmit the configuration information of the first PDU session included in the received URSP to the telephony service manager 603, so as to control the telephony service manager 603 to set up the first PDU session.

According to various embodiments of the disclosure, in operation 917, the telephony service manager 603 and the communication processor 507 may set up the first PDU session based on the configuration information of the first PDU session.

According to various embodiments of the disclosure, in operation 919, the telephony service manager 603 may transmit a response message indicating that the setup of the first PDU session is completed to the URSP handler 504.

According to various embodiments of the disclosure, the URSP handler 504 may transmit information indicating that setup of the first PDU session is completed to the EEC 503.

According to various embodiments of the disclosure, the EEC 503 may perform a discovery procedure with the second server 520 via the first PDU session in operation 921.

According to various embodiments of the disclosure, the EEC 503 may access the second server 520 via the first PDU session in response to the setup of the first PDU session. The EEC 503 may transmit, to the second server 520, an edge service discovery request message that requests the access information of at least one third server 530 connected to the second server 520. The second server 520 may transmit, to the EEC 503, an edge service discovery response message including the access information of the third server 530 that is stored in the second server 520.

According to various embodiments of the disclosure, in operation 923, the EEC 503 may receive, from the application 505, a request for setting up a connection to the third server 530.

According to various embodiments of the disclosure, the service that uses the third server 530 may be an edge computing service using the edge network system 500. The application 505 may be an application capable of using an edge computing service. The EEC 503 may select the third server 530 to access, based on comparison between the identification information of the application 505 and the identifier (ACID) of an application of the third server 530 included in the access information of the third server 530.

According to various embodiments of the disclosure, the EEC 503 may search for the third server 530 capable of providing a service usable by the application 505, from the access information of the third server 530, in response to reception of a request for connecting a service using the third server 530 from the application 505. The EEC 503 may identify an application identifier (e.g., com.android.app1) that is identical to an application identifier (e.g., com.android.app1) to be used by the application 505 among application identifiers (e.g., com.android.app1 and com.android.app2) included in the identifier of the third server 530, and may transmit the domain name (e.g., app1.edge.com) or the IP address (e.g., 3.3.3.1) of the third server 530 corresponding to the identified application identifier (e.g., com.android.app1) to the application 505.

According to various embodiments of the disclosure, although not receiving the request for setting up the connection to the third server 530 from the application 505, the EEC 503 may search for the third server 530. According to an embodiment, if execution of an application included in an application list included in the access information of the third server 530 is detected, the EEC 503 may search for the third server 530. According to an embodiment, if occurrence of traffic related to an application included in an application list included in the access information of the third server 530 is detected, the EEC 503 may search for the third server 530. According to an embodiment, the EEC 503 may search for the third server 530, in response to reception of a request for accessing the third server 530 included in the access information of the third server 530.

According to various embodiments of the disclosure, in operation 925, the EEC 503 may set up a connection between the application 505 and the third server 530.

According to various embodiments, a method of performing configuration so that the EEC 503 sets up a connection between the application 505 and the third server 530 may include a method of performing configuration so that the application 505 communicates with an application installed in the third server 530, by transferring the access information of the third server 530 to the application 505. For example, the EEC 503 may transmit the access address information of the third server 530 and the identification information of the application 505 to the URSP handler 504. The URSP handler 504 may set up a first PDU session based on the identification information of the application 505 and the access address information of the third server 530, so that the application 505 uses the first PDU session. According to an embodiment, the URSP handler 9504 may perform configuration so that the application 505 and the third server 530 are connected via the first PDU session. The data that the application 505 transmits or receives may be transmitted via the first PDU session. The EEC 503 may transmit, to the application 505, a response message including the access address information of the server application (e.g., the IP address of the server application) in response to a domain name system (DNS) query request of the client application (e.g., application 505). The application 505 may be configured to communicate with an application of the third server 530 based on the access information of the server application.

According to various embodiments of the disclosure, the electronic device 400 (or the processor 501) may set up a connection between the application 505 and the third server 530 so that the application 505 and the third server 530 exchange data via the first PDU session.

According to various embodiments of the disclosure, the application 505 may be connected to the third server 530 via the first PDU session, and may perform a service in operation 927.

An electronic device according to various embodiments may include a memory storing an application, an edge enabler client (EEC), and/or a UE route selection policy (URSP) rule used for producing a session to be used by the electronic device; a communication circuit to be used for a communication connection between the electronic device and a first server, a plurality of second servers, and/or a third server disposed outside the electronic device, via a base station; and a processor, wherein the application is configured to perform, in the electronic device, one or more services corresponding to an application executable in the third server, and wherein the processor is configured to identify identification information of the EEC and identification information of an EEC included in the URSP rule, in response to activation of the EEC, to set a first PDU session based on configuration information of the first PDU session included in the URSP rule, in response to accordance between the identification information of the EEC and the identification information included in the URSP rule, to perform a provisioning procedure with the first server via the first PDU session, to select a second server to access based on access information of the second server which is for accessing the second server and is received via the provisioning procedure, to perform a discovery procedure with the selected second server via the first PDU session, and to perform, via the first PDU session, the service with a third server selected based on access information of the third server which is received via the discovery procedure.

In the electronic device according to various embodiments, the processor may be configured to perform a provisioning procedure with the first server via a second PDU session that is used by the electronic device, in response to identification that the identification information of the EEC is not included in the URSP rule.

In the electronic device according to various embodiments, the processor may be configured to perform a provisioning procedure with the first server via the second PDU session, to select a second server to access based on access information of the second server which is for accessing the second server and is received via the provisioning procedure, to set up a first PDU session based on configuration information of the first PDU session included in the URSP rule, in response to the fact that a domain address corresponding to the selected second server is included in the URSP, and to perform the service by accessing the selected second server via the first PDU session.

In the electronic device according to various embodiments, the processor may be configured to set up a first PDU session based on configuration information of the first PDU session included in the access information of the second server, in response to the fact that the domain address corresponding to the selected second server is not included in the URSP rule.

In the electronic device according to various embodiments, the URSP rule may include information associated a first PDU session accessible at a designated location, and the processor may be configured to set up the first PDU session based on the URSP rule, in response to the fact that the electronic device is located at the designated location.

In the electronic device according to various embodiments, the processor may be configured to detect that the application is activated, and to set up the first PDU session based on configuration information of the first PDU session, in response to the fact that identification information of the application is included in the URSP rule.

In the electronic device according to various embodiments, the processor may be configured to detect a request for a domain address of the third server, and to produce the first PDU session based on PDU information included in the URSP rule, in response to the fact that the domain address of the third server is included in the URSP rule.

In the electronic device according to various embodiments, the processor may be configured to select a PDU session to be used for accessing the third server among a plurality of PDU sessions, based on a characteristic of a service provided by the third server included in the access information of the third server and characteristics of the plurality of PDU sessions included in the URSP rule.

In the electronic device according to various embodiments, the characteristic of the service provided by the third server may include a characteristic related to maintaining of a connection between the electronic device and the third server.

In the electronic device according to various embodiments, the EEC may be configured to support a plurality of operation modes, and the processor may be configured to select a second server accessible in a first operation mode, based on identification information of a service provider of the second server which is included in the second server access information received via the provisioning procedure, in response to the activation of the first operation mode among the plurality of operation modes.

Figure 10:
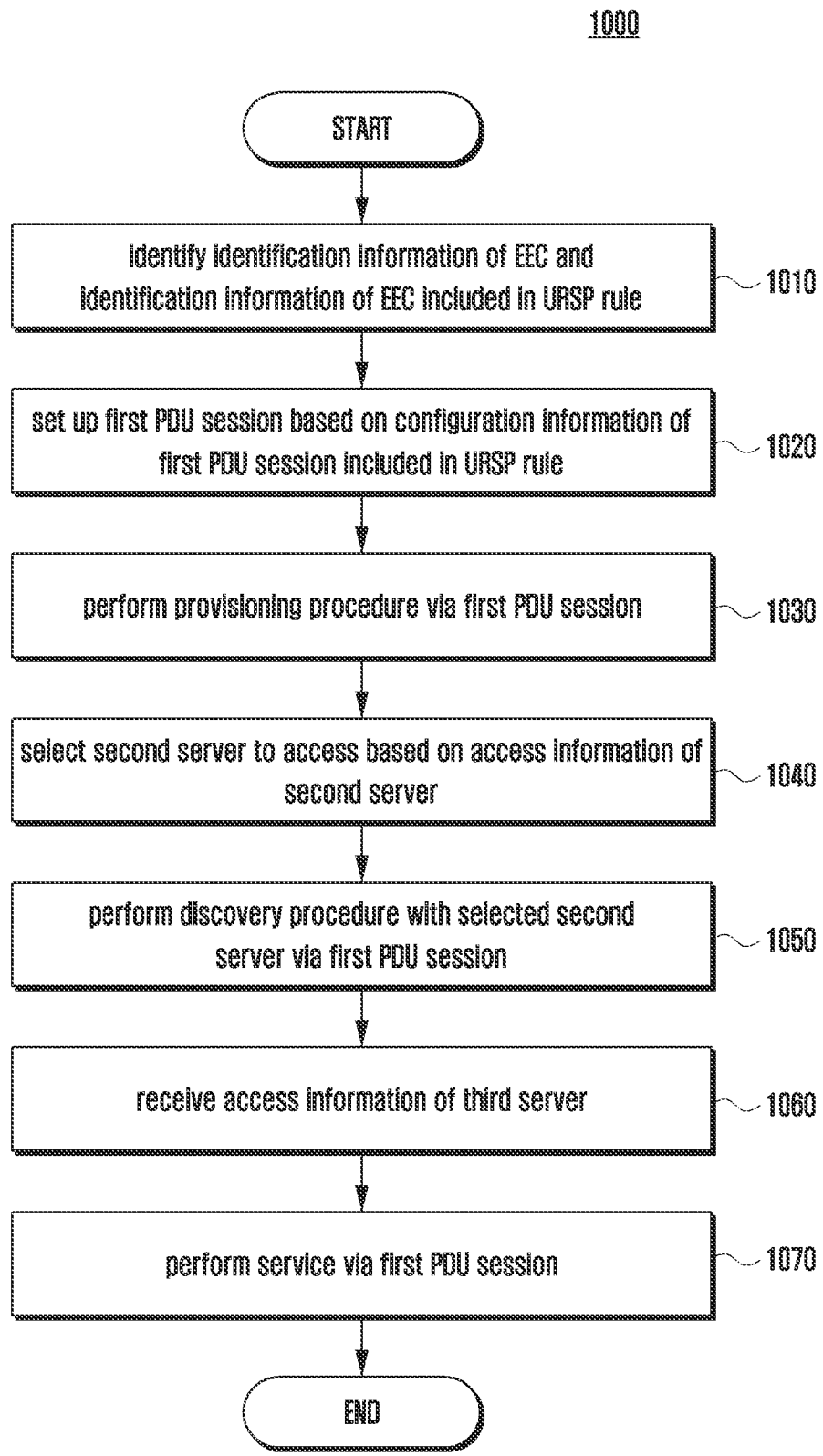
FIG. 10 is an operational flowchart illustrating an operation method of an electronic device according to an embodiment of the disclosure.

FIG. 10 is a flowchart illustrating an operation method of an electronic device according to an embodiment of the disclosure.

The illustrated operations may be performed via at least one of at least one element of an electronic device (e.g., an electronic device 101 of FIG. 1, an electronic device 400 of FIG. 4). For example, the operations illustrated in FIG. 10 may be performed via at least one of a processor (e.g., the processor 120 of FIG. 1, the processor 501 of FIG. 5) and a communication processor (e.g., the sub-processor 124 of FIG. 1, the wireless communication module 192 of FIG. 1, the first communication processor 212 of FIG. 2, the second communication processor 214, and the communication processor 507 of FIG. 5).

Referring to FIG. 10 depicting flowchart 1000, according to various embodiments of the disclosure, in operation 1010, an electronic device 400 may identify identification information of an EEC (e.g., an EEC 503 of FIG. 5) and the identification information of an EEC included in a UE route selection policy (URSP) rule.

According to various embodiments of the disclosure, the electronic device 400 may receive a URSP rule from a core network (e.g., the core network 420 of FIG. 5).

According to various embodiments of the disclosure, the URSP rule may include information related to a PDU session operation policy. The URSP rule may include information related to an element which is capable of using a predetermined PDU session (e.g., the identification information of the application 505 of FIG. 5 or the identification information of the EEC 503) and/or information related to an element which is accessible via a predetermined PDU session (e.g., the identification information of the first server 510, the second server 520, and/or the third server 530 of FIG. 4, the access address information of the first server 510, the second server 520, and/or the third server 530 (e.g., the IP address, port number, or protocol information of the first server 510, the second server 520, and/or the third server 530), and the domain name of the first server 510, the second server 520, and/or the third server 530). The information related to an element capable of using a predetermined PDU session may be included in the traffic descriptor field of the URSP rule. For example, the traffic descriptor field may include the identification information (e.g., OSId, OSAppId) of an application that accesses a predetermined server (e.g., the first server 510, the second server 520, and/or the third server 530), the access address information of a predetermined server (e.g., an IP address, a port number, protocol information, a domain name), and/or the name (data network name (DNN)) of a network accessed via the predetermined PDU session.

According to various embodiments of the disclosure, the URSP rule may include information including the characteristic of the predetermined PDU session. The characteristic of the predetermined PDU session may include various types of information including the list of the names (data network name (DNN)) of networks accessible via the predetermined PDU session, single network slice selection assistance information (S-NSSAI) indicating the identification information of a network slice used by the predetermined PDU session, and/or information (service session continuity (SSC mode)) indicating a mode related to continuity of the connection of the predetermined PDU session. The information including the characteristic of the predetermined PDU session may be included in the route selection descriptor field of the URSP rule. The information including the predetermined PDU session may be information needed for the electronic device 400 to set up the predetermined PDU session (e.g., produce, identify, and/or select the predetermined PDU session). The information including the characteristic of the predetermined PDU session may include the valid time (time window) of the predetermined PDU session and the location information at which the access of the predetermined PDU session is available.

According to various embodiments of the disclosure, in operation 1020, the electronic device 400 may set up a first PDU session based on the configuration information of the first PDU session included in the URSP rule, in response to accordance between the identification information of the EEC 503 and the identification information of the EEC included in the URSP rule.

According to various embodiments of the disclosure, the electronic device 400 may identify whether the identification information of the EEC 503 is included in the URSP, in response to the fact that the EEC 503 is activated (or access to the edge network system 500 is requested). The electronic device 400 may identify the identification information of the EEC 503 and the identification information of the EEC 503 included in the URSP rule, in response to identification that the identification information of the EEC 503 is included in the URSP rule (or identification that only the identification information of the EEC is included in the traffic descriptor of the URSP). The electronic device 400 may perform a series of operations for setting up the first PDU session based on PDU session configuration information included in the URSP rule, in response to accordance between the identification information of the EEC 503 and the identification information of the EEC 503 included in the URSP rule. The PDU session configuration information may be an RSD included in the URSP rule. The first PDU session may be a dedicated session via which the electronic device 400 is connected to the edge network system 500 and exchanges data.

According to various embodiments of the disclosure, the electronic device 400 may perform a provisioning procedure with a first server (e.g., the first server 510 of FIG. 4) via the first PDU session in operation 1030.

According to various embodiments of the disclosure, the electronic device 400 may access the first server 510 via the first PDU session, and may perform a provisioning procedure with the first server 510, in response to the setup of the first PDU session. Via the provisioning procedure, the EEC 503 may receive, from the first server 510, the access information of at least one second server 520 managed by the first server 510.

According to various embodiments of the disclosure, the electronic device 400 may select the second server 520 to access based on the access information of the second server 520 (e.g., the second server 520 of FIG. 4) in operation 1040.

The electronic device 400 may identify at least one second server 520 included in the access information of the second server 520, and may select the second server 520 to access.

According to various embodiments of the disclosure, the electronic device 400 may perform a discovery procedure with the selected second server 520 via the first PDU session in operation 1050.

According to various embodiments of the disclosure, the electronic device 400 may access the second server 520 via the first PDU session based on the access information of the selected second server 520. The electronic device 400 may transmit, to the second server 520, an edge service discovery request message that requests the access information of at least one third server 530 connected to the second server 520. The second server 520 may transmit, to the electronic device 400, an edge service discovery response message including the access information of the third server 530 that is stored in the second server 520.

According to various embodiments of the disclosure, in operation 1060, the electronic device 400 may receive the access information of the third server 530 from the second server 520.

The electronic device 400 may receive, from the application 505, a request for setup of a connection to the third server 530.

According to various embodiments of the disclosure, the service that uses the third server 530 may be an edge computing service using the edge network system 500. The application 505 may be an application capable of using an edge computing service. The electronic device 400 may select the third server 530 to access, based on comparison between the identification information of the application 505 and the identifier (ACID) of an application of the third server 530 included in the access information of the third server 530.

According to various embodiments of the disclosure, the electronic device 400 may search for the third server 530 capable of providing a service usable by the application 505, from the access information of the third server 530, in response to reception of a request for connecting a service using the third server 530 from the application 505. The electronic device 400 may identify an application identifier (e.g., com.android.app1) that is identical to an application identifier (e.g., com.android.app1) to be used by the application 505 among application identifiers (e.g., com.android.app1 and com.android.app2) included in the identifier of the third server 530, and may transmit the domain name (e.g., app1.edge.com) or the IP address (e.g., 3.3.3.1) of the third server 530 corresponding to the identified application identifier (e.g., com.android.app1) to the application 505.

According to various embodiments of the disclosure, the electronic device 400 may set up a connection between the application 505 and the third server 530.

According to various embodiments, a method of performing configuration so that the electronic device 400 sets up a connection between the application 505 and the third server 530 may include a method of performing configuration so that the application 505 communicates with an application installed in the third server 530, by transferring the access information of the third server 530 to the application 505. For example, the EEC 503 may transmit the access address information of the third server 530 and the identification information of the application 505 to the URSP handler 504. The URSP handler 504 may set up a first PDU session based on the identification information of the application 505 and the access address information of the third server 530, so that the application 505 uses the first PDU session. The electronic device 400 may transmit, to the application 505, a response message including the access address information of the server application (e.g., the IP address of the server application) in response to a domain name system (DNS) query request of the client application (e.g., application 505). The application 505 may be configured to communicate with an application of the third server 530 based on the access information of the server application.

According to various embodiments of the disclosure, the electronic device 400 (or the processor 501) may set up the connection between the application 505 and the third server 530 so that the application 505 and the third server 530 exchange data via the first PDU session.

According to various embodiments of the disclosure, the electronic device 400 may perform a service via the first PDU session in operation 1070.

Figure 11:
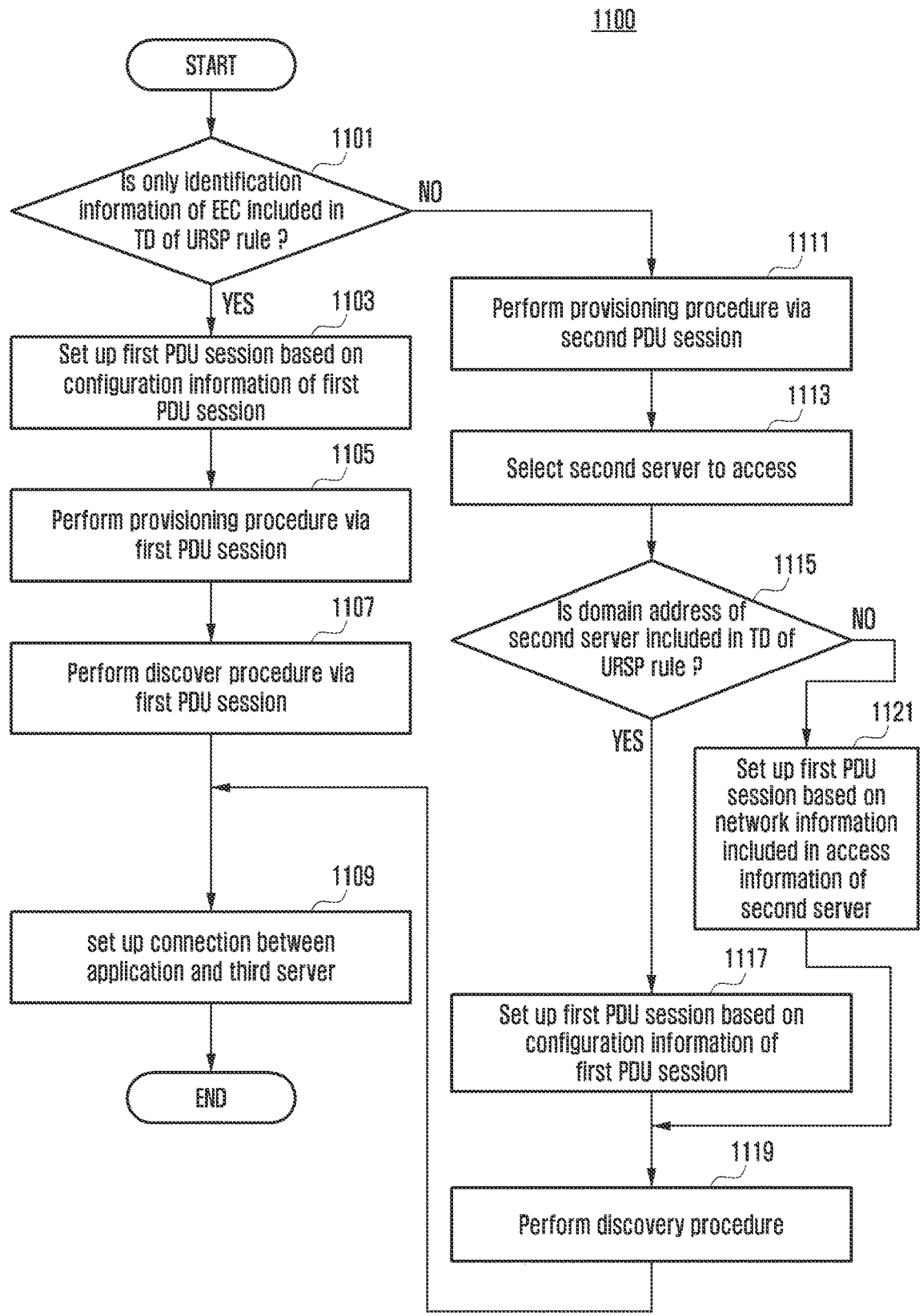
FIG. 11 is an operational flowchart illustrating an operation method of an electronic device according to an embodiment of the disclosure.

FIG. 11 is a flowchart illustrating an operation method of an electronic device according to an embodiment of the disclosure.

The illustrated operations may be performed via at least one of at least one element of an electronic device (e.g., the electronic device 101 of FIG. 1, the electronic device 400 of FIG. 4). For example, the operations illustrated in FIG. 10 may be performed via at least one of a processor (e.g., the processor 120 of FIG. 1, the processor 501 of FIG. 5) and a communication processor (e.g., the sub-processor 124 of FIG. 1, the wireless communication module 192 of FIG. 1, the first communication processor 212 of FIG. 2, the second communication processor 214, and the communication processor 507 of FIG. 5).

Referring to FIG. 11 depicting flowchart 1100, according to various embodiments of the disclosure, an electronic device 400 may identify whether only the identification information of an EEC (e.g., the EEC 503 of FIG. 5) is present in a traffic descriptor (TD) of a UE route selection policy (URSP) rule in operation 1101.

According to various embodiments of the disclosure, the electronic device 400 may receive a URSP rule from a core network (e.g., the core network 420 of FIG. 5).

According to various embodiments of the disclosure, the URSP rule may include information related to a PDU session operation policy. The URSP rule may include information related to an element which is capable of using a predetermined PDU session (e.g., the identification information of the application 505 of FIG. 5, the identification information of the EEC 503) and/or information related to an element which is accessible via a predetermined PDU session (e.g., the identification information of the first server 510, the second server 520, and/or the third server 530 of FIG. 4, the access address information of the first server 510, the second server 520, and/or the third server 530 (e.g., the IP address, port number, or protocol information of the first server 510, the second server 520, and/or the third server 530), and the domain name of the first server 510, the second server 520, and/or the third server 530). The information related to an element capable of using a predetermined PDU session may be included in the traffic descriptor field of the URSP rule. For example, the traffic descriptor field may include the identification information (e.g., OSId, OSAppId) of an application that accesses a predetermined server (e.g., the first server 510, the second server 520, and/or the third server 530), the access address information of a predetermined server (e.g., an IP address, a port number, protocol information, a domain name), and/or the name (data network name (DNN)) of a network accessed via the predetermined PDU session.

According to various embodiments of the disclosure, the URSP rule may include information including the characteristic of a predetermined PDU session. The characteristic of the predetermined PDU session may include various types of information including the list of the names (data network name (DNN)) of networks accessible via the predetermined PDU session, single network slice selection assistance information (S-NSSAI) indicating the identification information of a network slice used by the predetermined PDU session, and/or information (service session continuity (SSC mode)) indicating a mode related to continuity of the connection of the predetermined PDU session. The information including the characteristic of the predetermined PDU session may be included in the route selection descriptor field of the URSP rule. The information including the predetermined PDU session may be information needed for the electronic device 400 to set up the predetermined PDU session (e.g., produce, identify, and/or select the predetermined PDU session). The information including the characteristic of the predetermined PDU session may include the valid time (time window) of the predetermined PDU session and the location information at which the access of the predetermined PDU session is available.

According to various embodiments of the disclosure, in operation 1103, the electronic device 400 may set up a first PDU session based on the configuration information of the first PDU session, in response to the fact that only identification information identical to the identification information of the EEC 503 is present in the URSP rule (operation 1101-Y).

The electronic device 400 may perform a series of operations for setting up the first PDU session based on PDU session configuration information included in the URSP rule, in response to accordance between the identification information of the EEC 503 and the identification information of the EEC 503 included in the URSP rule. The PDU session configuration information may be an RSD included in the URSP rule. The first PDU session may be a dedicated session via which the electronic device 400 is connected to the edge network system 500 and exchanges data.

According to various embodiments of the disclosure, the electronic device 400 may perform a provisioning procedure with a first server (e.g., the first server 510 of FIG. 5) via the first PDU session in operation 1105.

According to various embodiments of the disclosure, the electronic device 400 may access the first server 510 via the first PDU session, and may perform a provisioning procedure with the first server 510, in response to the setup of the first PDU session. Via the provisioning procedure, the electronic device 400 may receive, from the first server 510, the access information of the second server 520 managed by the first server 510. The electronic device 400 may identify at least one second server 520 included in the access information of the second server 520, and may select the second server 520 to access.

According to various embodiments of the disclosure, the electronic device 400 may perform a discovery procedure with the selected second server 520 via the first PDU session in operation 1107.

According to various embodiments of the disclosure, the electronic device 400 may access the second server 520 via the first PDU session based on the access information of the selected second server 520. The electronic device 400 may transmit, to the second server 520, an edge service discovery request message that requests the access information of at least one third server 530 connected to the second server 520. The second server 520 may transmit, to the electronic device 400, an edge service discovery response message including the access information of the third server 530 that is stored in the second server 520.

According to various embodiments of the disclosure, the electronic device 400 may search for the third server 530 capable of providing a service usable by the application 505, from the access information of the third server 530, in response to reception of a request for connecting a service using the third server 530 from the application 505. The electronic device 400 may identify an application identifier (e.g., com.android.app1) that is identical to an application identifier (e.g., com.android.app1) to be used by the application 505 among application identifiers (e.g., com.android.app1 and com.android.app2) included in the identifier of the third server 530, and may transmit the domain name (e.g., app1.edge.com) or the IP address (e.g., 3.3.3.1) of the third server 530 corresponding to the identified application identifier (e.g., com.android.app1) to the application 505.

According to various embodiments of the disclosure, the electronic device 400 may set up a connection between the application 505 and the third server 530 based on the access information of the selected third server 530 in operation 1109.

According to various embodiments of the disclosure, in operation 1111, the electronic device 400 may perform a provisioning procedure with the first server 510 via a second PDU session when it is not that only identification information identical to the identification information of the EEC 503 is present (operation 1101-N) in the URSP rule.

The second PDU session is a session different from the first PDU session, and may be a PDU session set up in advance by the electronic device 400 in order to exchange data with the server 430. For example, the second PDU session may be a PDU session configured for a network (default network) that the electronic device 400 basically uses, or a PDU session set up based on a URSP rule which is before updating. The first PDU session may be a dedicated PDU session usable by an application capable of performing an edge service, and the second PDU session may be a general-purpose PDU session usable by an application capable of performing an edge service and a non-edge service.

According to various embodiments of the disclosure, in operation 1113, the electronic device 400 may select the second server 520 to access among at least one second server 520 included in the access information of the second server 520 received via the provisioning procedure.

According to various embodiments of the disclosure, in operation 1115, the electronic device 400 may identify whether the domain address of the selected second server 520 is present in the TD of the URSP.

According to various embodiments of the disclosure, the electronic device 400 may identify the domain address (fully qualified domain name, FQDN) of the selected second server 520 based on the access information of the second server 520. The electronic device 400 may identify whether the domain address of the second server 520 is present in the URSP.

According to various embodiments of the disclosure, in operation 1117, the electronic device 400 may set up a first PDU session based on the configuration information of the first PDU session included in the URSP, in response to the fact that the domain address of the second server 520 is present in the TD of the URSP (in operation 1115-Y).

According to various embodiments of the disclosure, in operation 1119, the electronic device 400 may perform a discovery procedure with the second server 520 via the first PDU session.

According to various embodiments of the disclosure, the electronic device 400 may set up the first PDU session based on the PDU session configuration information included in the access information of the second server 520, in response to the fact that the configuration information of the first PDU session is included in the access information of the second server 520. The electronic device 400 may perform a discovery procedure with the second server 520 since the first PDU session is set up.

According to various embodiments of the disclosure, the electronic device 400 may perform a discovery procedure with the second server 520 via the second PDU session, in response to the fact that the configuration information of the first PDU session is not included in the access information of the second server 520.

According to various embodiments of the disclosure, the electronic device 400 may set up a first PDU session based on the configuration information of the first PDU session included in the URSP rule (in operation 1121), in response to the fact that the domain address of the second server 520 is not present in the TD of the URSP rule (in operation 1115-N).

The electronic device 400 may perform a discovery procedure with the second server 520 via the first PDU session.

An operation method of an electronic device according to various embodiments may include identifying identification information of an edge enabler client (EEC), and identification information of an EEC included in a UE route selection policy (URSP) rule used for producing a session to be used by the electronic device, in response to activation of the EEC; setting up a first PDU session based on configuration information of the first PDU session included in the URSP, in response to accordance between the identification information of the EEC and the identification information included in the URSP rule; performing a provisioning procedure with a first server via the first PDU session; selecting a second server to access based on access information of the second server which is for accessing the second server and is received via the provisioning procedure; performing a discovery procedure with the selected second server via the first PDU session; and performing, via the first PDU session, the service with a third server selected based on access information of the third server received via the discovery procedure.

The operation method of the electronic device according to various embodiments of the disclosure may further include an operation of performing a provisioning procedure with the first server via a second PDU session that is used by the electronic device, in response to the fact that the identification information of the EEC is not included in the URSP rule.

The operation method of the electronic device according to various embodiments of the disclosure may further include an operation of performing a provisioning procedure with the first server via the second PDU session; an operation of selecting a second server to access based on access information of the second server which is for accessing the second server and is received via the provisioning procedure; an operation of setting up the first PDU session based on configuration information of the first PDU session, in response to the fact that a domain address corresponding to the selected second server is included in the URSP rule; and an operation of performing the service by accessing the selected second server via the first PDU session.

The operation method of the electronic device according to various embodiments of the disclosure may further include an operation of setting up the first PDU session based on configuration information of the first PDU session included in the access information of the second server, in response to the fact that the domain address corresponding to the selected second server is not included in the URSP rule.

In the operation method of the electronic device according to various embodiments of the disclosure, the URSP rule may include information associated with a first PDU session accessible at a designated location, and the operation method of the electronic device may further include an operation of setting up the first PDU session based on the URSP, in response to the fact that the electronic device is located at the designated location.

The operation method of the electronic device according to various embodiments of the disclosure may further include an operation of detecting activation of the application; and an operation of setting up the first PDU session based on configuration information of the first PDU session, in response to the fact that identification information of the application is included in the URSP rule.

The operation method of the electronic device according to various embodiments of the disclosure may further include an operation of detecting a request for a domain address of the third server; and an operation of setting up the first PDU session based on the configuration information of the first PDU session included in the URSP rule, in response to the fact that the domain address of the third server is included in the URSP rule.

The operation method of the electronic device according to various embodiments of the disclosure may further include an operation of selecting a PDU session to be used for accessing the third server among a plurality of PDU sessions, based on a characteristic of a service provided by the third server included in the access information of the third server and characteristics of a plurality of PDU sessions included in the URSP rule.

In the operation method of the electronic device according to various embodiments of the disclosure, the characteristic of the service provided by the third server may include a characteristic related to maintaining a connection between the electronic device and the third server.

In the operation method of the electronic device according to various embodiments of the disclosure, the EEC supports a plurality of operation modes, and the operation method of the electronic device may include an operation of selecting a second server accessible in a first operation mode, based on identification information of a service provider of the second server which is included in the access information of the second server received via the provisioning procedure, in response to activation of the first operation mode among the plurality of operation modes.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a memory storing an application, an edge enabler client (EEC), a first identification information of the EEC and a user equipment (UE) route selection policy (URSP) rule used for producing a session used by the electronic device;
a communication circuit used for a communication connection between the electronic device and at least one of a first server, a plurality of second servers, or a third server disposed outside the electronic device, via a base station; and
a processor,
wherein the application is configured to perform, in the electronic device, one or more services corresponding to an application executable in the third server,
wherein the processor is configured to:
receive a route selection policy (URSP) rule used for producing a session used by the electronic device,
identify whether a second identification information of an EEC is included in the URSP rule, in response to activation of the EEC,
set a first packet data unit (PDU) session based on configuration information of the first PDU session included in the URSP rule, if the first identification information of the EEC is same with the second identification information of the EEC included in the URSP rule, wherein the first PDU session is dedicated PDU session for performing an edge service, perform a provisioning procedure with the first server via the first PDU session, select a second server to access based on access information of the second server, the access information of the second server for accessing the second server and received via the provisioning procedure, perform a discovery procedure with the selected second server via the first PDU session, and perform, via the first PDU session, a service with a third server selected based on access information of the third server which is received via the discovery procedure, and wherein the processor is further configured to perform a provisioning procedure with the first server via a second PDU session, if the first identification information of the EEC is not included in the URSP rule, and the second PDU session is default PDU session for performing the edge service and a non-edge service.

2. The electronic device of claim 1, wherein the processor is further configured to:

perform a provisioning procedure with the first server via the second PDU session;

select a second server to access based on access information of the second server which is for accessing the second server and is received via the provisioning procedure;

set up a first PDU session based on configuration information of the first PDU session included in the URSP rule, in response to a domain address corresponding to the selected second server being included in the URSP; and perform the service by accessing the selected second server via the first PDU session.

3. The electronic device of claim 2, wherein the processor is further configured to set up a first PDU session based on configuration information of the first PDU session included in the access information of the second server, in response to the domain address corresponding to the selected second server not being included in the URSP rule.

4. The electronic device of claim 1, wherein the URSP rule comprises information associated a first PDU session accessible at a designated location, and wherein the processor is further configured to set up the first PDU session based on the URSP rule, in response to the electronic device being located at the designated location.

5. The electronic device of claim 1, wherein the processor is further configured to:

detect that the application is activated; and set up a first PDU session based on configuration information of the first PDU session, in response to identification information of the application being included in the URSP rule.

6. The electronic device of claim 5, wherein the processor is further configured to:

detect a request for a domain address of the third server; and produce the first PDU session based on PDU information included in the URSP rule, in response to the domain address of the third server being included in the URSP rule.

7. The electronic device of claim 1, wherein the processor is further configured to select a PDU session to be used for accessing the third server among a plurality of PDU sessions, based on a characteristic of a service provided by the third server included in the access information of the third server and characteristics of the plurality of PDU sessions included in the URSP rule.

8. The electronic device of claim 7, wherein the characteristic of the service provided by the third server comprises a characteristic related to maintaining of a connection between the electronic device and the third server.

9. The electronic device of claim 1, wherein the EEC is configured to support a plurality of operation modes, and wherein the processor is further configured to select a second server accessible in a first operation mode, based on identification information of a service provider of the second server which is included in the access information of the second server received via the provisioning procedure, in response to activation of the first operation mode among the plurality of operation modes.

10. An operation method of an electronic device storing a first identification information of an edge enabler client (EEC), the operation method comprising:

receiving route selection policy (URSP) rule used for producing a session used by the electronic device;

in response to activation of an edge enabler client (EEC), identifying whether a second identification information of an EEC is included in the URSP rule;

setting up a first packet data unit (PDU) session based on configuration information of the first PDU session included in the URSP, if the first identification information of the EEC is same with the second identification information of the EEC included in the URSP rule, wherein the first PDU session is dedicated PDU session for performing an edge service;

performing a provisioning procedure with a first server via the first PDU session;

selecting a second server to access based on access information of the second server which is for accessing the second server and is received via the provisioning procedure;

performing a discovery procedure with the selected second server via the first PDU session; and performing, via the first PDU session, a service with a third server selected based on access information of the third server received via the discovery procedure, wherein the method further comprises:

performing the provisioning procedure with the first server via a second PDU session that is used by the electronic device, if the first identification information of the EEC is not included in the URSP rule, wherein the second PDU session is default PDU session for performing the edge service and a non-edge service.

11. The method of claimer 10, further comprising:

performing a provisioning procedure with the first server via the second PDU session;

selecting a second server to access based on access information of the second server which is for accessing the second server and is received via the provisioning procedure;

setting up a first PDU session based on configuration information of the first PDU session, in response to a domain address corresponding to the selected second server being included in the URSP rule; and performing the service by accessing the selected second server via the first PDU session.

12. The method of claim 11, further comprising setting up the first PDU session based on configuration information of the first PDU session included in the access information of the second server, in response to the domain address corresponding to the selected second server not being included in the URSP rule.

13. The method of claim 10,
wherein the URSP rule comprises information associated with a first PDU session accessible at a designated location, and
wherein the operation method of the electronic device further comprises setting up the first PDU session based on the URSP, in response to the electronic device being located at the designated location.

14. The method of claim 10, further comprising:
detecting activation of an application; and
setting up a first PDU session based on configuration information of the first PDU session, in response to identification information of the application being included in the URSP rule.

15. The method of claim 14, further comprising:
detecting a request for a domain address of the third server; and
setting up the first PDU session based on the configuration information of the first PDU session included in the URSP rule, in response to the domain address of the third server being included in the URSP rule.

16. The method of claim 10, further comprising:
selecting a PDU session to be used for accessing the third server among a plurality of PDU sessions, based on a characteristic of a service provided by the third server included in the access information of the third server and characteristics of a plurality of PDU sessions included in the URSP rule.

17. The method of claim 16, wherein the characteristic of the service provided by the third server comprises a characteristic related to maintaining a connection between the electronic device and the third server.

18. The method of claim 10,
wherein the EEC supports a plurality of operation modes, and
wherein the operation method of the electronic device further comprises selecting a second server accessible in a first operation mode, based on identification information of a service provider of the second server which is included in the access information of the second server received via the provisioning procedure, in response to activation of the first operation mode among the plurality of operation modes.

19. The method of claim 10, wherein the URSP rule comprises a data network name (DNN) of a network accessible via a predetermined PDU session.

20. The method of claim 10, wherein the URSP rule comprises identification information of a network slice usable by a predetermined PDU session.

21. The method of claim 10, wherein the URSP rule comprises information indicating a characteristic of a service usable via a predetermined PDU session.

* * * * *